US012664088B2

(12) United States Patent
Seok et al.

(10) Patent No.: US 12,664,088 B2
(45) Date of Patent: Jun. 23, 2026

(54) METHOD OF OPERATING STORAGE CONTROLLER, STORAGE DEVICE, AND METHOD OF OPERATING STORAGE DEVICE TO PERFORM COPY-BLOCK OPERATION BASED ON NUMBER OF CORRECTED BITS

(71) Applicant: SAMSUNG ELECTRONICS CO., LTD., Suwon-si (KR)

(72) Inventors: Junyeong Seok, Suwon-si (KR); Myungkyu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/944,859

(22) Filed: Nov. 12, 2024

(65) Prior Publication Data

US 2025/0217280 A1     Jul. 3, 2025

(30) Foreign Application Priority Data

Jan. 2, 2024     (KR) ........................ 10-2024-0000498

(51) Int. Cl.
G06F 12/00          (2006.01)
G06F 12/02          (2006.01)

(52) U.S. Cl.
CPC ................................ G06F 12/0246 (2013.01)

(58) Field of Classification Search
CPC .... G06F 12/0246; G06F 3/0619; G06F 3/065; G06F 3/0658; G06F 3/0679; G06F 11/1048; G06F 11/1068; G06F 2212/1032; G06F 2212/7203; G06F 2212/7204; G06F 3/0614; G06F 3/0604; G06F 11/10; G06F 12/1009; G06F 2212/1016; G06F 2212/403; G11C 16/0483; G11C 16/10; G11C 16/26; G11C 16/3431
USPC ....................................................... 711/103
See application file for complete search history.

(56)          References Cited

U.S. PATENT DOCUMENTS

| 7,921,339 B2 | 4/2011 | Chen et al. |
| 8,271,515 B2 | 9/2012 | Reid |
| 8,595,593 B2 | 11/2013 | Joo |
| 8,909,982 B2 | 12/2014 | Weston-Lewis et al. |

(Continued)

FOREIGN PATENT DOCUMENTS

KR     10-2013-0076430 A     7/2013

*Primary Examiner* — Mardochee Chery
(74) *Attorney, Agent, or Firm* — Sughrue Mion, PLLC

(57)          ABSTRACT

A method includes selecting, by a storage controller, a representative page of a first group stored in a first area included in a non-volatile memory device; receiving, by the storage controller, the representative page from the non-volatile memory device; performing, by the storage controller, an error detection operation of determining a number of error bits for the representative page; based on determining that the number of error bits of the representative page exceeds a threshold value, performing an external copy-back operation, by the storage controller, for each page of the first group to a second area included in the non-volatile memory device; and based on determining that the number of error bits of the representative page is less than or equal to the threshold value, performing an internal copy-back operation, by the storage controller, for each page of the first group to the second area.

20 Claims, 17 Drawing Sheets

(56) References Cited

U.S. PATENT DOCUMENTS

| | | | |
|---|---|---|---|
| 8,996,959 B2 | 3/2015 | Jung et al. | |
| 9,389,973 B2 | 7/2016 | Jones et al. | |
| 10,353,622 B2 | 7/2019 | Haratsch et al. | |
| 10,535,406 B2 | 1/2020 | Hwang et al. | |
| 11,309,052 B2 | 4/2022 | Muchherla et al. | |
| 11,604,695 B2 | 3/2023 | Cariello et al. | |
| 2009/0106513 A1 | 4/2009 | Cheng et al. | |
| 2013/0159815 A1* | 6/2013 | Jung | G06F 12/00 |
| | | | 714/763 |
| 2016/0124806 A1* | 5/2016 | Yen | G06F 11/1068 |
| | | | 714/764 |
| 2018/0061494 A1* | 3/2018 | Hwang | G11C 11/5642 |
| 2020/0319964 A1* | 10/2020 | Kim | G06F 11/1489 |

* cited by examiner

| | Page 1 | Page 5 | Page 9 | Page 13 |
|---|---|---|---|---|
| NEB | v1 | v2 | v3 | v4 | v1 > v4 > vth > v3 > v2

METHOD OF OPERATING STORAGE CONTROLLER, STORAGE DEVICE, AND METHOD OF OPERATING STORAGE DEVICE TO PERFORM COPY-BLOCK OPERATION BASED ON NUMBER OF CORRECTED BITS

CROSS-REFERENCE TO RELATED APPLICATION

This application is based on and claims priority under 35 U. S. C. § 119 to Korean Patent Application No. 10-2024-0000498, filed on Jan. 2, 2024 in the Korean Intellectual Property Office, the disclosure of which is incorporated by reference herein in its entirety.

BACKGROUND

1. Field

The embodiments of the present disclosure to a semiconductor memory, and more particularly, to a method of operating a storage controller, a storage device, and a method of operating the storage device.

2. Description of Related Art

The semiconductor memory may include a volatile memory device and a flash memory device, such as static random access memory (SRAM), dynamic RAM (DRAM), etc., in which data stored therein disappears when power supply thereto is blocked, and a non-volatile memory device, such as phase-change RAM (PRAM), magnetoresistive RAM (MRAM), resistive RAM (RRAM), ferroelectric RAM (FRAM), etc., in which data stored therein is maintained even when power supply thereto is blocked.

Data movement may occur inside the non-volatile memory device. If data stored in a single level cell (SLC) area is migrated to a triple level cell (TLC) area, data movement is required. Data movement is required in a garbage collection operation. In one or more embodiments, data movement is required in a reclaim operation. In these operations, data may move from a first memory block of the non-volatile memory device to a second memory block of the non-volatile memory device. When data stored in a non-volatile memory device is read, the data may include errors according to a reliability level. To correct the errors, the non-volatile memory device may transmit the data to the storage controller, and the storage controller may correct the error by performing an error detection operation or an error correction operation. However, time is required to output data from a non-volatile memory device to a storage controller and to transmit the corrected data from the storage controller to the non-volatile memory device, thereby reducing performance.

SUMMARY

The embodiments of the present disclosure provide a method of operating a storage controller, a storage device, and a method of controlling the storage device.

According to an aspect of the disclosure, a method of operating a storage controller and a storage device comprising a non-volatile memory device comprises selecting, by the storage controller, a representative page of a first group of pages stored in a first area included in the non-volatile memory device; receiving, by the storage controller, the representative page from the non-volatile memory device; performing, by the storage controller, an error detection operation of determining a number of error bits for the representative page; based on determining that the number of error bits of the representative page exceeds a threshold value, performing an external copy-back operation, by the storage controller, for each of a plurality of pages of the first group of pages to a second area included in the non-volatile memory device; and based on determining that the number of error bits of the representative page is less than or equal to the threshold value, performing an internal copy-back operation, by the storage controller, for each of the plurality of pages of the first group of pages to the second area.

According to an aspect of the disclosure, a storage device comprises: a non-volatile memory device comprising a first area and a second area; and a storage controller configured to perform a migration operation in which pages of a first group of pages stored in the first area are moved to the second area, wherein the storage controller, to perform the migration operation, is configured to: select a representative page of the first group of pages, perform an error detection operation that determines a number of error bits of the representative page of the first group of pages, based on a determination that the number of error bits of the representative page exceeds a threshold value, perform an external copy-back operation for each of a plurality of pages of the first group of pages to the second area, and based on a determination that the number of error bits of the representative page is less than or equal to the threshold value, perform an internal copy-back operation for each of the plurality of pages of the first group of pages.

According to an aspect of the disclosure, a storage device comprises: a non-volatile memory device comprising a first area and a second area; and a storage controller configured to perform a migration operation in which pages of a first group of pages stored in the first area are moved to the second area, wherein the storage controller, to perform the migration operation, is configured to: select a representative page of the first group of pages, perform an error detection operation that determines a number of error bits of the representative page of the first group of pages, based on a determination that the number of error bits of the representative page exceeds a threshold value, perform an external copy-back operation for each of a plurality of pages of the first group of pages to the second area, and based on a determination that the number of error bits of the representative page is less than or equal to the threshold value, perform an internal copy-back operation for each of the plurality of pages of the first group of pages.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
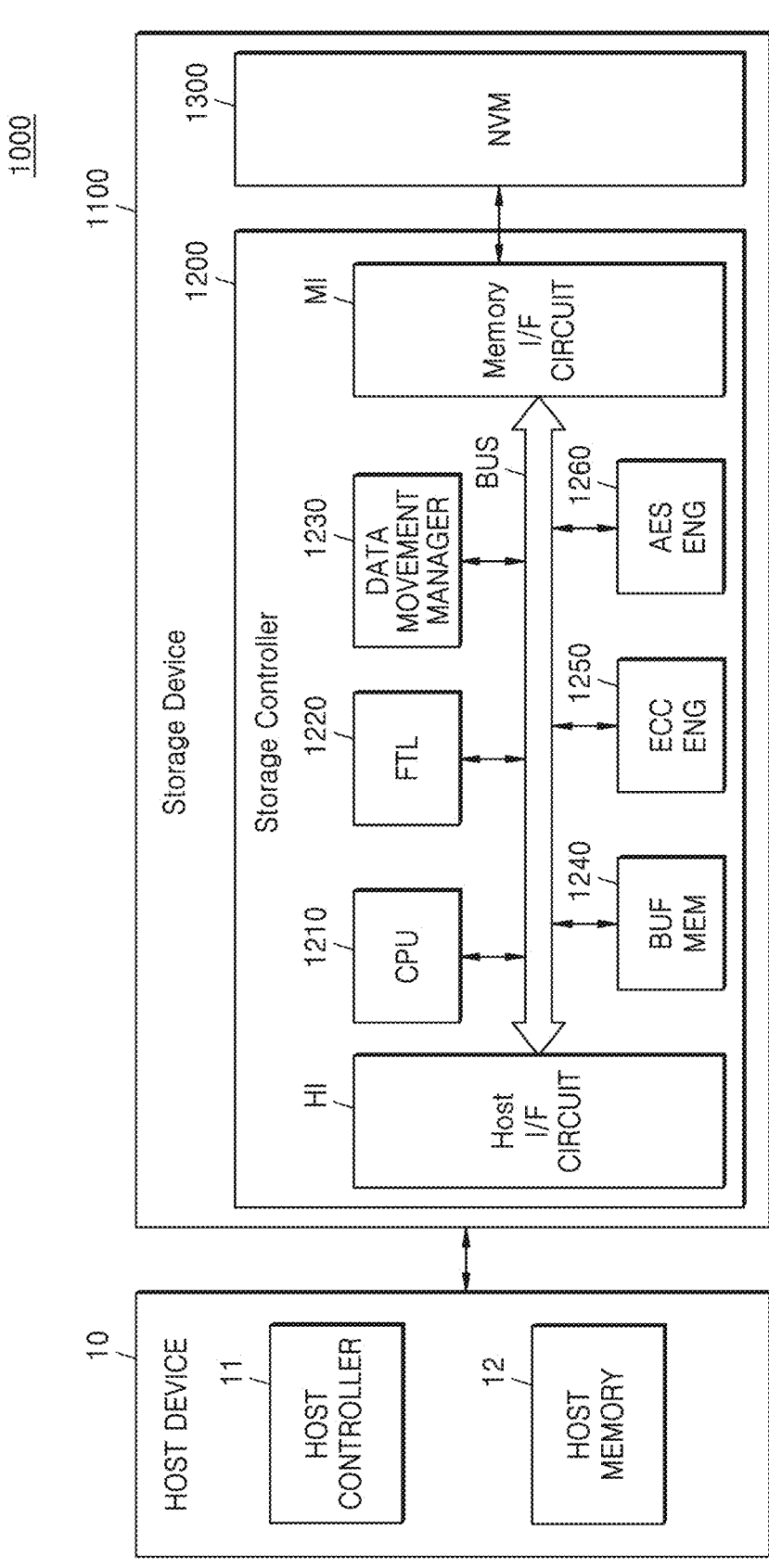
FIG. 1 is a block diagram of a storage system according to one or more embodiments.

Hereinafter, embodiments will be described clearly and in detail such that one of ordinary skill in the art may easily implement the embodiments of the present disclosure.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. In one or more embodiments, as used herein, the articles "a" and "an" are intended to include one or more items, and may be used interchangeably with "one or more." Where only one item is intended, the term "one" or similar language is used. In one or more embodiments, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a block diagram of a storage system 1000 according to one or more embodiments.

Referring to FIG. 1, the storage system 1000 may include a host device 10 and a storage device 1100. In one or more embodiments, the storage device 1100 may include a storage controller 1200 and a non-volatile memory device (NVM) 1300. According to one or more embodiments, the host device 10 may include a host controller 11 and a host memory 12. The host memory 12 may function as a buffer memory for temporarily storing data to be transmitted to the storage device 1100 or data transmitted from the storage device 1100.

The storage device 1100 may include storage media for storing data according to requests from the host device 10. For example, the storage device 1100 may include at least one of a solid state drive (SSD), an embedded memory, a removable external memory, or any other suitable memory structure known to one of ordinary skill in the art. When the storage device 1100 includes an SSD, the storage device 1100 may comply with the NVM express (NVMe) protocol. When the storage device 1100 includes an embedded memory or an external memory, the storage device 1100 may comply with the universal flash storage (UFS) protocol or the embedded multi-media card (eMMC) protocol. The host device 10 and the storage device 1100 may each generate and transmit packets according to an adopted standard protocol.

When the NVM 1300 of the storage device 1100 includes a flash memory, the flash memory may include a 2D NAND memory array or a 3D (or vertical) NAND (VNAND) memory array. In some embodiments, the storage device 1100 may include other various types of NVMs. Examples of the storage device 1100 may include magnetic RAM (MRAM), spin-transfer torque MRAM (STT MRAM), conductive bridging RAM (CBRAM), ferroelectric RAM (Fe- RAM), phase RAM (PRAM), resistive RAM (RRAM), and various other types of memories.

According to one or more embodiments, the host controller 11 and the host memory 12 may be implemented as separate semiconductor chips. According to one or more embodiments, the host controller 11 and the host memory 12 may be integrated on the same semiconductor chip. As an example, the host controller 11 may be any of multiple modules provided in an application processor, and the application processor may be implemented as a system on chip (SoC). In one or more embodiments, the host memory 12 may be an embedded memory included in the application processor or may be an NVM or a memory module provided outside the application processor.

The host controller 11 may manage operations of storing data of a buffer area (e.g., write data) in the NVM 1300 or storing data of the NVM 1300 (e.g., read data) in the buffer area. In one or more examples, the host controller 11 may retrieve data from or store data to the NVM 1300 via the storage controller 1200.

The storage controller 1200 may include a host interface circuit HI, a memory interface circuit MI, and a central processing unit (CPU) 1210. In one or more embodiments, the storage controller 1200 may further include a flash translation layer (FTL) 1220, a data movement manager 1230, a buffer memory 1240, an error correction code (ECC) engine 1250, and an advanced encryption standard (AES) engine 1260. The storage controller 1200 may further include a working memory onto which the FTL 1220 is loaded, and the data write and read operation of the NVM may be controlled by execution of the FTL 1220 by the CPU 1210. The storage controller 1200 may further include a packet manager.

In one or more examples, the host interface circuit HI may transmit and receive packets to and from the host device 10. Packets transmitted from the host device 10 to the host interface circuit HI may include a command or data to be written to the NVM 1300, and packets transmitted from the host interface circuit HI to the host device 10 may include a response to the command or data read from the NVM 1300. The memory interface circuit MI may transmit data to be written to the NVM 1300 to the NVM 1300 or receive data read from the NVM 1300. The memory interface circuit MI may comply with standard protocols such as Toggle, open NAND flash interface (ONFI), or any other suitable protocol known to one of ordinary skill in the art.

In one or more examples, the FTL 1220 may perform several functions such as address mapping, wear-leveling, and garbage collection. The address mapping is an operation that changes a logical address received from the host to a physical address used to actually store data in the NVM 1300. The wear-leveling is technology for preventing excessive deterioration of a particular block by allowing blocks in the NVM 1300 to be used uniformly, and may be implemented through, for example, firmware technology for balancing erase counts of the physical blocks. The garbage collection is technology for securing available capacity in the NVM 1300 by copying valid data of the block to a new block and erasing an existing block.

The ECC engine 1250 may perform error detection and correction functions for read data read from the NVM 1300. The ECC engine 1250 may perform an error detection operation and an error correction operation. The ECC engine 1250 may perform the error detection operation to determine whether there is an error in the data. The ECC engine 1250 may perform the error detection operation to determine the number of error bits (NEB) of the data.

More particularly, the ECC engine 1250 may generate parity bits for write data to be written to the NVM 1300, and the generated parity bits may be stored in the NVM 1300 together with the write data. When data is read from the NVM 1300, the ECC engine 1250 may correct an error of the read data by using the parity bits read from the NVM 1300 together with the read data and may output read data of which the error is corrected.

In one or more embodiments, the ECC engine 1250 may perform the error detection operation or error correction operation by using one of cyclic redundancy check (CRC) (e.g., CRC-16, CRC-32, CRC-64, CRC-128, CRC-256, etc.), Hamming code, Low Density Parity Check (LDPC), Bose-Chaudhuri-Hocquenghem (BCH) code, Reed-Solomon (RS) code, Viterbi code, and Turbo code.

An AES engine 1260 may perform at least one of an encryption operation and a decryption operation for data input to the storage controller 1200 by using a symmetric-key algorithm.

The packet manager may generate a packet complying with the protocol of the interface between the packet manager and the host device 10 or parse various pieces of information from the packet received from the host device 10. The buffer memory 1240 may temporarily store data to be written to the NVM 1300 or data to be read from the NVM 1300. The buffer memory 1240 may be included in the storage controller 1200 or may be provided outside the storage controller 1200.

The data movement manager 1230 may perform a copy-back operation. The data movement manager 1230 may have a form of hardware, software, or a combination thereof, all configured to manage the copy-back operation. The data movement manager 1230 may determine a copy-back method of the remaining pages of a group based on the NEB of a representative page. The data movement manager 1230 may determine from one of an internal copy-back operation and an external copy-back operation.

The data movement manager 1230 may manage the group. The data movement manager 1230 may divide pages stored in a source area (e.g., a first area A1) in the copy-back operation into a plurality of groups. For example, a plurality of pages included in the same group may have similar error rates. The data movement manager 1230 may select a representative page to represent a group. The data movement manager 1230 may select a page that is expected to have a high error rate in the group as the representative page. For example, the data movement manager 1230 may select a firstly programmed page as a representative page.

The data movement manager 1230 may determine the copy-back method of a group according to an error level of the representative page. The data movement manager 1230 may perform an external copy-back operation only for a group that is expected to have many errors and may perform an internal copy-back operation for a group that is expected to have less errors. Accordingly, performance deterioration due to the external copy-back operation may be prevented. The operation of the data movement manager 1230 may be described in more detail with reference to the drawings below.

In one or more examples, each of the FTL 120, data movement manager 1230, ECC engine 1250, and the AES ENG 1260 may be implemented by a separate processor, or may be implemented by separate circuitry. In one or more examples, the operations performed by each of the FTL 120, data movement manager 1230, ECC engine 1250, and the AES ENG 1260 may be performed by one or more processors.

Figure 2:
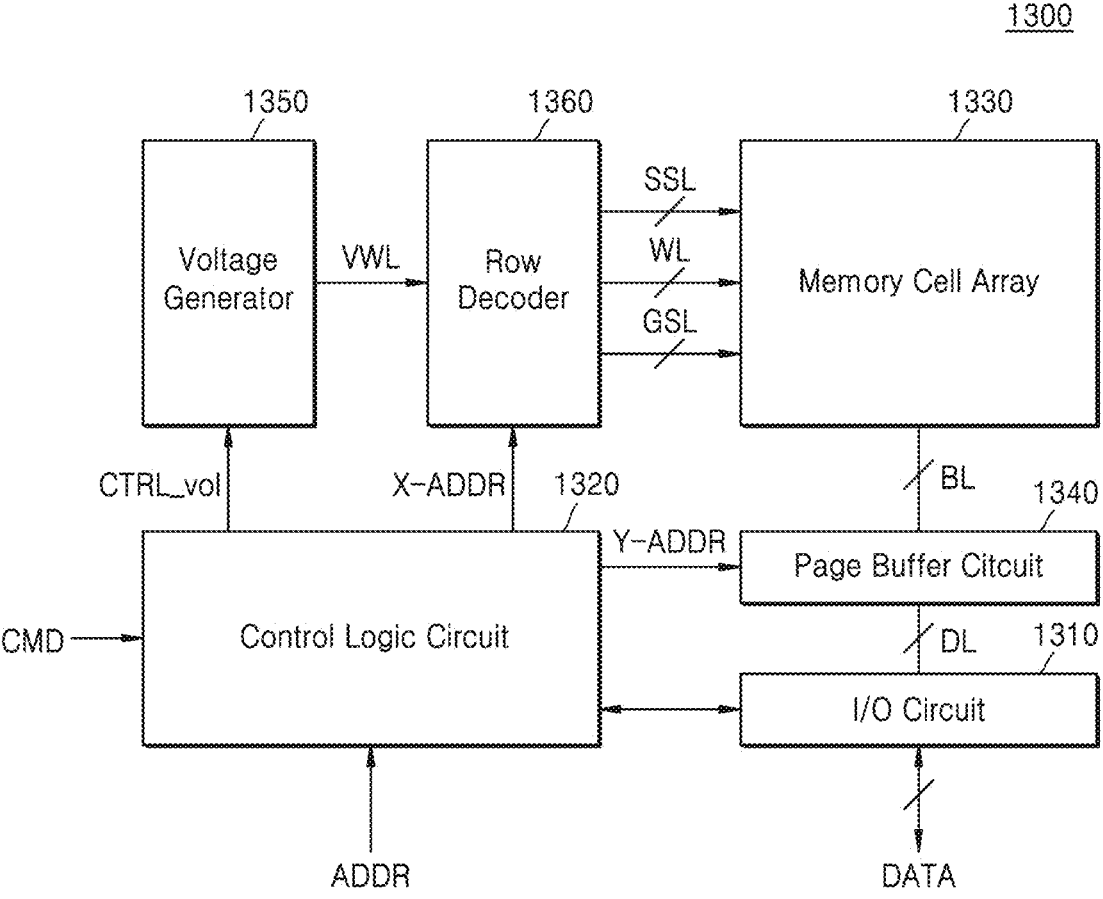
FIG. 2 is a block diagram of a non-volatile memory device of FIG. 1 in more detail according to one or more embodiments.

FIG. 2 is a block diagram of the NVM 1300 of FIG. 1 in accordance with one or more embodiments.

Referring to FIGS. 1 and 2, the NVM 1300 may include an input/output circuit 1310, a control logic circuit 1320, a memory cell array 1330, a page buffer circuit 1340, a voltage generator 1350, and a row decoder 1360. The NVM 1300 may further include, in one or more examples, a column logic, a pre-decoder, a temperature sensor, a command decoder, an address decoder, etc.

In one or more examples, the control logic circuit 1320 may generally control various operations of the NVM 1300. The control logic circuit 1320 may output various control signals in response to the command CMD and/or address ADDR from the input/output circuit 1310. For example, the control logic circuit 1320 may output a voltage control signal CTRL_vol, a row address X-ADDR, and a column address Y-ADDR.

In one or more examples, the memory cell array 1330 may include a plurality of memory blocks, and each of the plurality of memory blocks may include a plurality of memory cells. The memory cell array 1330 may be connected to the page buffer circuit 1340 through bit lines BL and may be connected to the row decoder 1360 through word lines WL, string select lines SSL, and ground select lines GSL.

In one or more embodiments, the memory cell array 1330 may include a 3D memory cell array. The 3D memory cell array may include a plurality of NAND strings. Each of the NAND strings may include memory cells respectively connected to word lines that are vertically stacked on a substrate. Further disclosures regarding the structure, operation, and manufacturing of non-volatile memory devices is found in U.S. Pat. Nos. 7,679,133, 8,553,466, 8,654,587, 8,559, 235, and US Patent Application Publication No. 2011/0233648 are incorporated herein in their entirety by reference. In one or more embodiments, the memory cell array 1330 may include a 2D memory cell array, and the 2D memory cell array may include a plurality of NAND strings arranged in row and column directions.

In one or more examples, the page buffer circuit 1340 may include a plurality of page buffers (e.g., n is an integer of 3 or more), and the plurality of page buffers may be respectively connected to the memory cells through the plurality of bit lines BL. The page buffer circuit 1340 may select at least one bit line from the bit lines BL in response to the column address Y-ADDR. The page buffer circuit 1340 may operate as a write driver or a sense amplifier according to the operation mode. For example, during a program operation, the page buffer circuit 1340 may apply a bit line voltage corresponding to the data that will be programmed by the selected bit line. During a read operation, the page buffer circuit 1340 may detect a current or voltage of the selected bit line and detect data stored in the memory cell.

In one or more examples, the voltage generator 1350 may generate various types of voltages for program, read, and erase operations based on the voltage control signal CTRL_vol. For example, the voltage generator 1350 may generate a program voltage, a read voltage, a program verification voltage, an erase voltage, or the like as a word line voltage VWL.

In one or more examples, the row decoder 1360 may select one of the word lines WL and one of the string select lines SSL in response to the row address X-ADDR. For example, the row decoder 1360 may apply a program voltage and a program verification voltage to the selected word line during the program operation, and during the read operation, the read voltage may be applied to the selected word line.

The storage controller 1200 may transfer a chip enable signal (/CE), a command latch enable signal (CLE), an address latch enable signal (ALE), a read enable signal (/RE), and a write enable signal (/WE) to the NVM 1300. The storage controller 1200 and the NVM 1300 may transmit and receive a data signal (DQ) and a data strobe signal (DQS) therebetween.

TABLE 1

| /CE | CLE | ALE | /WE | /RE | DQS | DQx | MODE |
|-----|-----|-----|-----|-----|-----|-----|------|
| L | H | L | ↑ | H | X | CMD | CMD Input |
| L | L | H | ↑ | H | X | ADDR | ADDR Input |
| L | L | L | H | H | ↑↓ | DATA_in | Data Input |
| L | L | L | H | ↑↓ | ↑↓ | DATA_out | Data Output |

Table 1 exemplifies the operation mode of the NVM 1300 according to the state of each signal in accordance with one or more embodiments. Referring to Table 1, while the NVM 1300 receives a command CMD or address ADDR or inputs and outputs DATA, a chip enable signal (/CE) remains in a low level (L). During a command input mode (CMD Input), the storage controller 1200 may control signal lines such that the clock latch enable signal (CLE) has a high level (H), the address latch enable signal (ALE) has a low level (L), the write enable signal (/WE) toggles between the high level (H) and the low level (L), and the read enable signal (/RE) has a high level (H). During the command input mode (CMD Input), the storage controller 1200 may transmit the command CMD to the NVM 1300 through data signals DQx, in synchronization with a rising edge (↑) of the write enable signal (/WE). The NVM 1300 may identify the command CMD from the data signal DQx in response to the rising edge (↑) of the write enable signal (/WE).

In one or more examples, during an address input mode (ADDR Input), the storage controller 1200 may control signal lines such that the clock latch enable signal (CLE) has a low level (L), the address latch enable signal (ALE) has a high level (H), the write enable signal (/WE) toggles between the high level (H) and the low level (L), and the read enable signal (/RE) has a high level (H). During the address input mode (ADDR Input), the storage controller 1200 may transmit the address ADDR to the NVM 1300 through data signals DQx, in synchronization with the rising edge (↑) of the write enable signal (/WE). The NVM 1300 may identify the address ADDR from the data signal DQx in response to the rising edge (↑) of the write enable signal (/WE).

In one or more examples, during the data input mode (Data Input), the storage controller 1200 may control the signal lines such that the clock latch enable signal (CLE) has a low level (L), the address latch enable signal (ALE) has a low level (L), the write enable signal (/WE) has a high level (H), the read enable signal (/RE) has a high level (H), and the data strobe signal (DQS) toggles between the high level (H) and the low level (L). During the data input mode (Data Input), the storage controller 1200 may transmit the DATA to the NVM 1300 through the data signal DQx, in synchronization with the rising edge (↑) and the falling edge (↑) of the data strobe signal (DQS). The NVM 1300 may identify the DATA from the data signal DQx in response to the rising edge (↑) and the falling edge (↑) of the data strobe signal DQS.

In one or more examples, during the data output mode (Data Output), the storage controller 1200 may control the signal lines such that the clock latch enable signal (CLE) has a low level (L), the address latch enable signal (ALE) has a low level (L), the write enable signal (/WE) has a high level (H), the read enable signal (/RE) has a high level (H), and the read enable signal (/RE) toggles between the high level (H) and the low level (L). During the data output mode (Data Output), the NVM 1300 may generate the data strobe signal (DQS) that toggles between the high level (H) and the low level (L), in response to the read enable signal (/RE). The NVM 1300 may transfer the DATA to the storage controller 1200 through the data signal DQx, in synchronization with the rising edge (↑) and the falling edge (↑) of the data strobe signal (DQS). The storage controller 1200 may identify the DATA from the data signal DQx, in response to the rising edge (↑) and the falling edge (↑) of the data strobe signal (DQS). The toggle interface described above is an example, and the scope of the embodiments of the present disclosure are not limited thereto.

Figure 3:
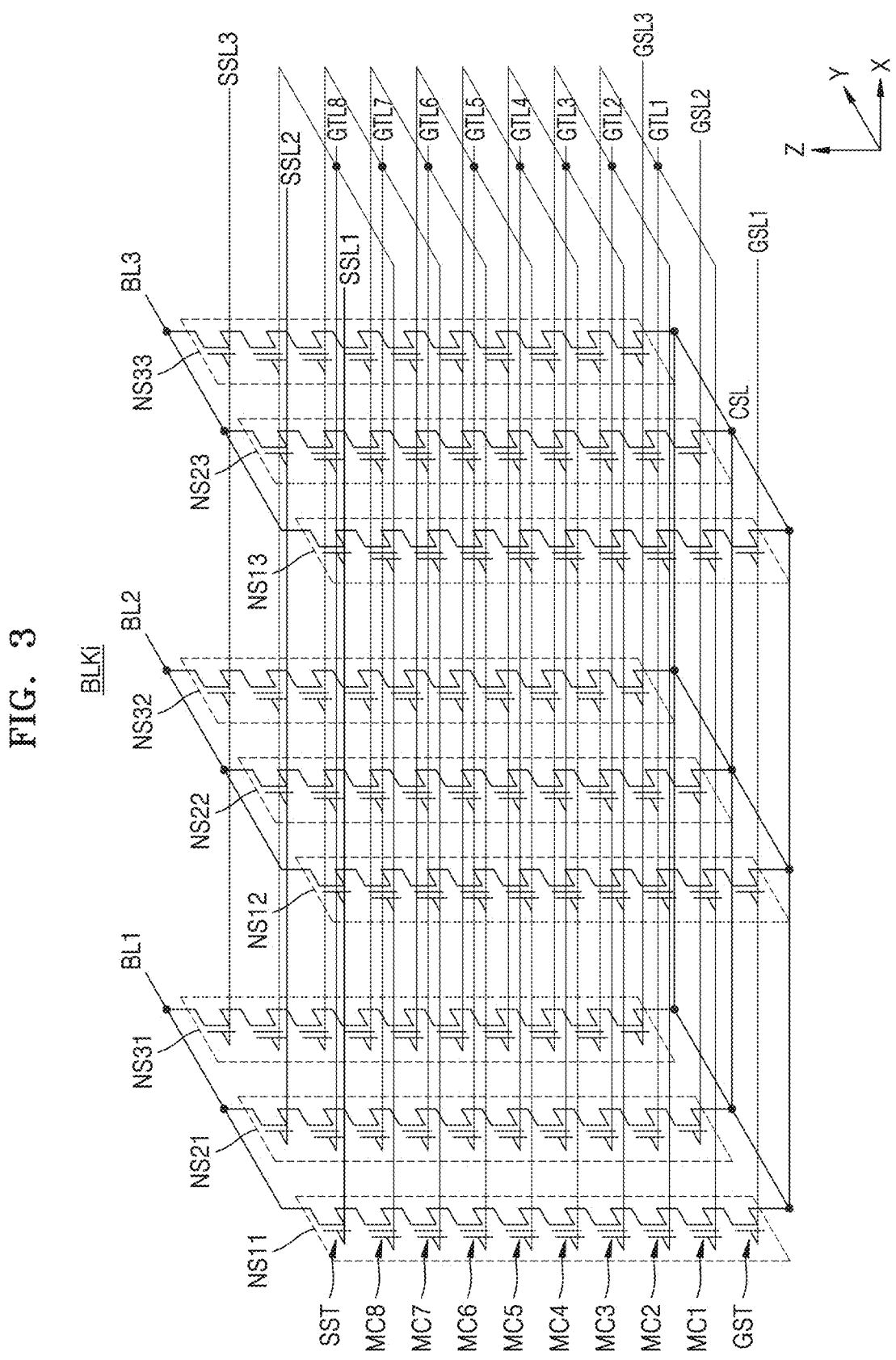
FIG. 3 is an equivalent circuit diagram of an example of a memory block of FIG. 2 according to one or more embodiments.

FIG. 3 is a equivalent circuit diagram of an example of a memory block of FIG. 2 in accordance with one or more embodiments.

Referring to FIG. 3, the memory block BLKi shows a three-dimensional memory block having a three-dimensional structure on a substrate. For example, a plurality of memory NAND strings included in a memory block BLKi may be formed in a direction perpendicular to the substrate. As understood by one of ordinary skill in the art, although the memory block illustrated in FIG. 3 illustrates 3 bit lines each connected to 8 memory cells, the embodiments of the present disclosure are not limited to these configurations, and the memory block may include any desired number of bit lines and memory cells.

Referring to FIG. 3, the memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1 to MC8, and a ground selection transistor GST. FIG. 3 shows that each of the plurality of memory NAND strings NS11 to NS33 includes eight memory cells MC1 to MC8, but is not necessarily limited thereto.

In one or more examples, the string selection transistor SST may be connected to string selection lines SSL1 to SSL3 corresponding thereto. The plurality of memory cells MC1 to MC8 may respectively be connected to corresponding gate lines GTL1 to GTL8. The gate lines GTL1 to GTL8 may correspond to the word lines, and some of the gate lines GTL1 to GTL8 may correspond to dummy word lines. The ground selection transistor GST may be connected to ground selection lines GSL1 to GSL3 corresponding thereto. The string selection transistor SST may be connected to each of the first to third bit lines BL1 to BL3 corresponding thereto, and the ground selection transistor GST may be connected to the common source line CSL.

In one or more examples, word lines at the same height (e.g., WL1) may be commonly connected, and ground selection lines GSL1 to GSL3 and string selection lines SSL1 to SSL3 may be each be separated. In FIG. 3, the memory block BLKi is shown to be connected to eight gate lines GTL1 to GTL8 and three bit lines BL1 to BL3, but embodiments are not limited thereto.

Figure 4:
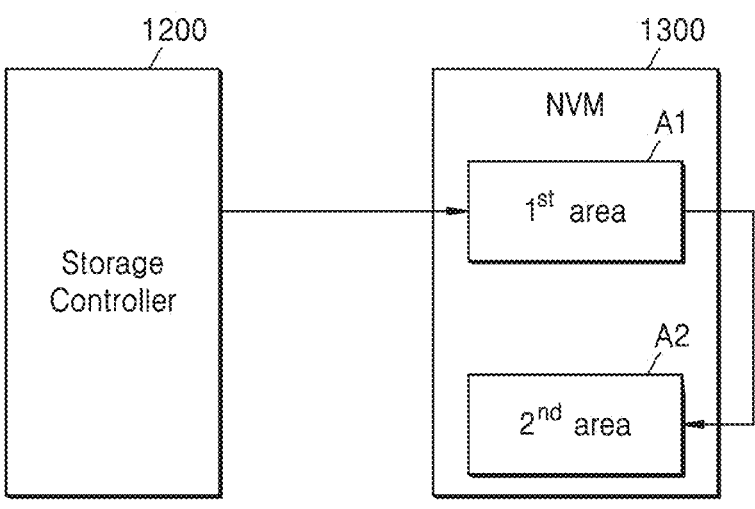
FIG. 4 is a diagram of an example of an operation of a storage device of FIG. 1 according to one or more embodiments.

FIG. 4 is a diagram of an example of an operation of the storage device 1100 of FIG. 1.

Referring to FIGS. 1 and 4, the NVM 1300 of the storage device 1100 may include the first area A1 and the second area A2 in accordance with one or more embodiments. The first area A1 may refer to a source area of the copy-back operation. For example, the first area A1 may refer to a space in which data to be read in the copy-back operation is stored. The second area A2 may refer to a destination area of the copy-back operation. For example, the second area A2 may refer to a space in which data is newly programmed in the copy-back operation.

In one or more examples, the storage device 1100 may perform a copy-back operation. For example, the storage device 1100 may perform the copy-back operation when performing a program operation based on an SLC buffering scheme. As part of the copy-back operation, instead of writing data directly to the second area A2, the storage device 1100 may first write data to the first area A1, and then write data to the second area A2. For example, the storage device 1100 may write data to the SLC area and then write data to the TLC or a quad level cell (QLC) area. The storage device 1100 may collect data from the first area A1 and program the data into the second area A2 simultaneously.

In one or more examples, the storage device 1100 may first write the write data received from the host device 10 to the first area A1. In this case, since the write data received from the host device 10 is written to the first area A1 (e.g., an SLC program), a faster operation speed may be guaranteed than when a normal write operation for the second area A2 (e.g., a TLC program or a QLC program) is performed.

Data written to the first area A1 may be flushed or migrated to the second area A2. For example, data written to the first area A1 may be migrated to the second area A2, depending on an explicit command from the host device 10 or an internally predetermined policy. For example, the policy may specify one or more conditions, which when met, causes migration of data from the first area A1 to the second area A2. For example, migration may be performed when a predetermined number of memory cells in the second area A2 become available or when the first area A1 is full and the second area A2 has a requisite number of cells available. In one or more embodiments, the storage device 1100 may perform a copy-back operation during an idle time.

In one or more embodiments, the first area A1 may be a buffer area. The second area A2 may be a user storage area. In one or more embodiments, each of the memory cells corresponding to the first area A1 may be used as an SLC and each of the memory cells corresponding to the second area A2 may be used as a TLC. In one or more embodiments, each of the memory cells corresponding to the first area A1 may be used as an SLC and each of the memory cells corresponding to the second area A2 may be used as a QLC. In one or more examples, each of the memory cells corresponding to the first area A1 may be configured to store n bits of data (e.g., n is a positive integer) and each of the memory cells corresponding to the second area A2 may be configured to store m bits of data (e.g., m is a positive integer greater than n). For example, the first area A1 may refer to an area that supports faster high-speed writing than the second area A2.

In one or more embodiments, the storage device 1100 may perform garbage collection. The storage controller 1200 may select a sacrifice block from among used blocks (or blocks with valid data) to generate a free block. The storage controller 1200 may copy valid pages within the selected sacrifice block to the free block. The storage controller 1200 may perform the copy-back operation. In one or more embodiments, the first area A1 may refer to the selected sacrifice block. The second area A2 may be the free block in which the valid pages are stored.

Figure 5A:
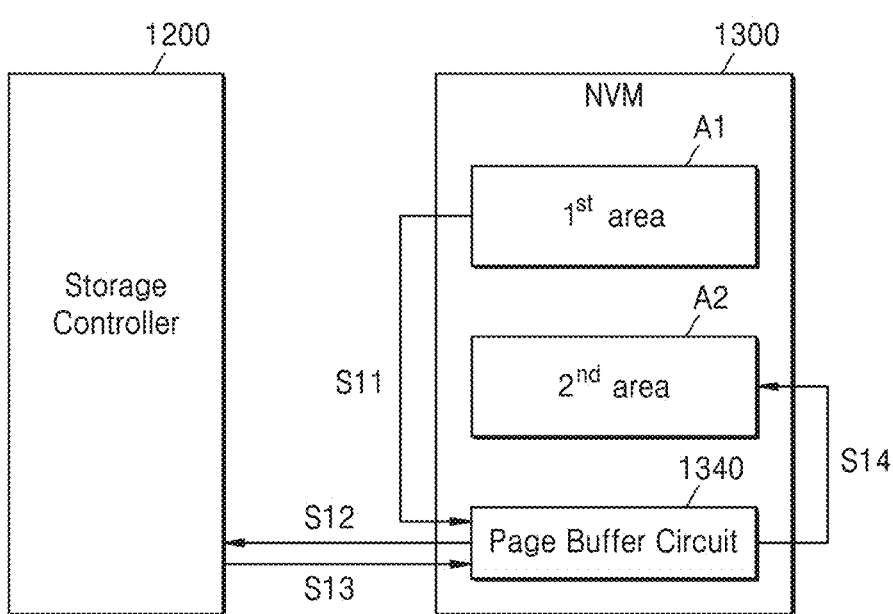
FIGS. 5A and 5B are diagrams of examples of a copy-back operation of a storage device according to one or more embodiments.
Figure 5B:
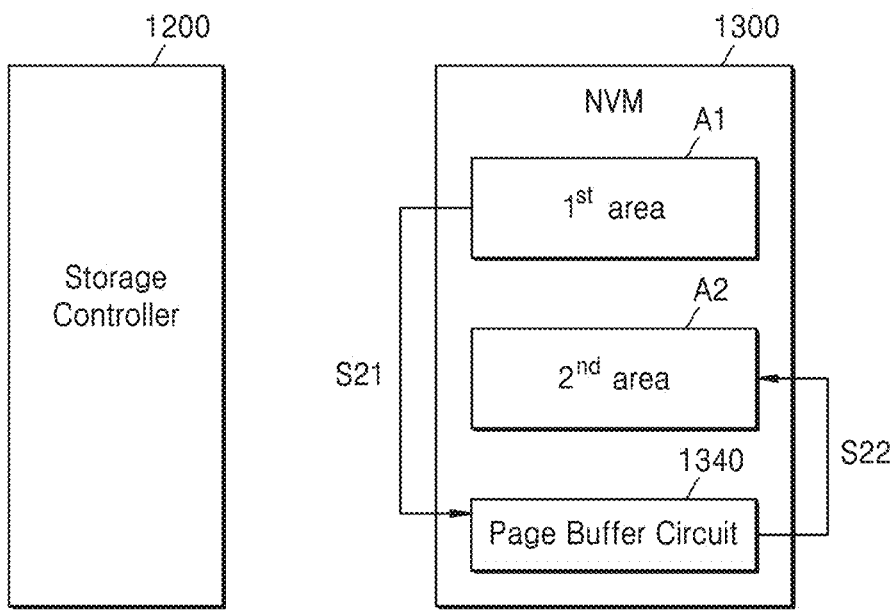

FIGS. 5A and 5B are diagrams showing examples of a copy-back operation of a storage device.

The external copy-back operation is described with reference to FIG. 5A and the internal copy-back operation is described with reference to FIG. 5B. Referring to FIGS. 1, 5A, and 5B. The storage device 1100 may move the data stored in the first area A1 to the second area A2. For example, the storage device 1100 may perform the copy-back operation.

In one or more embodiments, the storage device 1100 may perform one of the external copy-back operation and the internal copy-back operation. The external copy-back operation may refer to a copy-back operation including data transmission and reception between the NVM 1300 and the storage controller 1200. The internal copy-back operation may refer to a copy-back operation not including data transmission and reception between the NVM 1300 and the storage controller 1200. For example, the copy-back operation may be performed by the NVM 1300 transferring data within the NVM 1300, or the copy-back operation may be performed by the storage controller 1200 transferring data within the storage controller 1200.

In one or more examples, the external copy-back operation may include transmitting data from the NVM 1300 to the storage controller 1200 and receiving data from the storage controller 1200 to the NVM 1300.

The external copy-back operation may include operations S11 to S14 in accordance with one or more embodiments. In operation S11, the NVM 1300 may transmit data stored in the first area A1 to the page buffer circuit 1340. The NVM 1300 may sense data stored in the first area A1 and store the sensed data in the page buffer circuit 1340.

In operation S12, the NVM 1300 may transmit data stored in the page buffer circuit 1340 to the storage controller 1200. Operation S12 may be referred to as a data output operation.

In one or more examples, the storage controller 1200 may perform the error detection operation and the error correction operation for the received data. The storage controller 1200 may perform the error correction operation to generate corrected data. In operation S13, the storage controller 1200 may transmit the corrected data to the NVM 1300. The NVM 1300 may store the corrected data in the page buffer circuit 1340. Operation S13 may be referred to as a data input operation.

In operation S14, the NVM 1300 may store data in the second area A2. For example, the NVM 1300 may program data into the second area A2. The NVM 1300 may store the corrected data stored in the page buffer circuit 1340 in the second area A2.

The internal copy-back operation may include operations S21 and S22. In operation S21, the NVM 1300 may transmit data stored in the first area A1 to the page buffer circuit 1340. The NVM 1300 may sense data stored in the first area A1 and store the sensed data in the page buffer circuit 1340. In operation S22, the NVM 1300 may store data in the second area A2. For example, the NVM 1300 may store data stored in the page buffer circuit 1340 in the second area A2.

In one or more examples, the internal copy-back operation may not include the data output operation and the data input operation of the external copy-back operation. The internal copy-back operation may not include the error correction operation performed by the storage controller 1200. Compared to the time required for the internal copy-back operation, the external copy-back operation may further include time required for the data output operation, time required for the error correction operation, and time required for the data input operation. The external copy-back operation may take more time than the internal copy-back operation.

Figure 6:
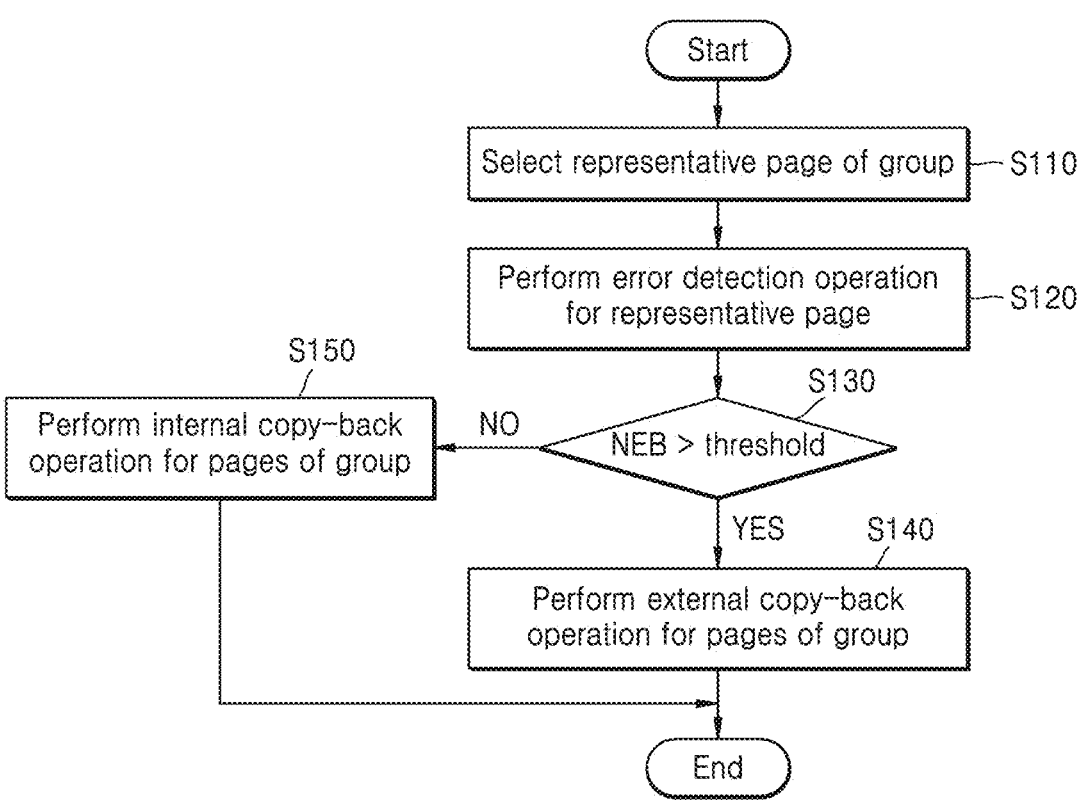
FIG. 6 is a flowchart of an example of an operation of the storage device of FIG. 1 according to one or more embodiments.

FIG. 6 is a flowchart of an example of an operation of the storage device of FIG. 1 in accordance with one or more embodiments.

An example method of the copy-back operation is described with reference to FIG. 6. The storage device 1100 is assumed to store data in the first area A1. The storage device 1100 may perform operations S110 to S150 to move the data stored in the first area A1 to the second area A2. Data stored in the first area A1 may be divided into a plurality of groups. Each of the plurality of groups may include a plurality of pages. The storage device 1100 may move data to the second area A2 in a group unit. The group unit may also be referred to as a group of pages.

In one or more embodiments, the group may include a plurality of pages, and the pages included in the same group may be expected to exhibit similar characteristics. For example, the pages in the same group may have the same or similar error rates. For example, the pages included in the same group may have similar reliability levels. The pages included in the same group may be stored in physically adjacent memory cells. The pages included in the same group may be programmed in the same or similar ways. The lapse of time after the pages included in the same group are programmed may be similar. The pages included in the same group may have the same or similar characteristics. Accordingly, the copy-back method of the remaining pages of the group may be determined based on the error rate (e.g., NEB) of the representative page of the group.

For example, the pages included in the same group may refer to the pages stored in the memory cells connected to the string selection lines of the same word line. The pages included in the same group may refer to the pages stored in the memory cells connected to adjacent word lines in the same block. The pages included in the same group may refer to the pages stored in the memory cells connected to the same word lines in different blocks. The pages included in the same group may refer to the pages stored in the memory cells connected to the same word lines in the same block of different planes. In one or more examples, the pages included in the same group may have similar physical positions. The pages included in the same group may have similar error levels. In one or more examples, one of the pages from the group may be selected as a representative page of the group.

In one or more embodiments, the storage device 1100 may move the data stored in the first area A1 to the second area A2 through any one of the internal copy-back operation and the external copy-back operation. The storage device 1100 may determine the copy-back method of the entire group based on the error rate or NEB of the representative page of the group.

Referring to FIGS. 1 and 6, in operation S110, the storage device 1100 may select the representative page of the group. In one or more embodiments, the storage controller 1200 may determine any one of the plurality of pages in the group as the representative page (e.g., a sample page). The storage controller 1200 may select the firstly programmed page in the group as the representative page. In one or more examples, the storage controller 1200 may select a page that is expected to have the lowest transfer rate between the storage controller 1200 and the NVM 1300. In one or more examples, the storage controller 1200 may select a page that is expected to have the highest error rate as the representative page.

For example, in the process of programing the memory cells connected to adjacent string selection lines, program disturbance may occur in the memory cells connected to the adjacent string selection lines. As a result, errors of the memory cells connected to the firstly programmed string selection line may be increased. The storage controller 1200 may select a page that is stored in the memory cells connected to the firstly programmed string selection line among the plurality of string selection lines connected to the same word line. The storage controller 1200 may select a page that is vulnerable to errors as the representative page.

In one or more examples, the storage controller 1200 may perform a read operation for the selected representative page. The storage controller 1200 may transmit a read command including the address corresponding to the representative page to the NVM 1300. The storage controller 1200 may receive the representative page from the NVM 1300.

In operation S120, the storage device 1100 may perform the error detection operation for the representative page. The storage controller 1200 may perform the error detection operation to determine the error rate or the NEB of the representative page. The storage controller 1200 may determine the NEB of the representative page.

In operation S130, the storage device 1100 may compare the NEB with a threshold value. The threshold value may be a predetermined value. The threshold value may be selected to be fixed or variable by designers, manufacturers, and/or users. The storage controller 1200 may determine whether the error correction operation is required based on the NEB of the representative page. The storage controller 1200 may determine whether to perform the external copy-back operation to perform the error correction operation, based on the NEB. In one or more examples, the storage device 1100 may perform operation S140 when the NEB exceeds the threshold value and may perform operation S150 when the NEB is equal to or less than the threshold value. In one or more examples, the storage controller 1200 may be configured with the threshold value. In one or more examples, the storage controller 1200 may dynamically determine the threshold value based on an error rate of data stored in the non-volatile memory.

In operation S140, the storage device 1100 may perform the external copy-back operation for the pages of the group. Since the NEB is greater than the threshold value, the storage controller 1200 may determine that the error correction operation is required. For example, since the error rate of the representative page is high, the storage controller 1200 may determine to perform the external copy-back operation for the plurality of pages in the group including the representative page. The storage controller 1200 may perform an external copy-back operation for the plurality of pages of the group.

In operation S150, the storage device 1100 may perform the internal copy-back operation for the pages of the group. Since the NEB is equal to or less than the threshold value, the storage controller 1200 may determine that the error correction operation is not required. For example, since the error rate of the representative page is low, the storage controller 1200 may determine to perform the internal copy-back operation for the plurality of pages in the group including the representative page. The storage controller 1200 may perform the internal copy-back operation for the plurality of pages of the group.

As described above, the storage device 1100 may select the representative page of the group stored in the first area A1. The storage device 1100 may perform the error detection operation to determine the NEB of the representative page. The storage device 1100 may repeat the external copy-back operation for each of the pages of the group to the second area A2 included in the NVM 130 when the NEB of the representative page exceeds the threshold value. The storage device 1100 may repeat the internal copy-back operation for each of the pages of the group to the second area A2 when the NEB of the representative page is equal to or less than the threshold value.

Accordingly, the storage device 1100 may advantageously omit the determining for the remaining pages in the group except for the representative page. In this regard, by applying a result of determining the NEB of the representative page to the remaining pages, the storage device 1100 may not determine the copy-back method for each of the remaining pages. The storage device 1100 may collectively determine the copy-back method of the remaining pages in the group based on the determination result of the representative page. Accordingly, the storage device with improved performance may be provided.

FIGS. 7, 8, 9A, and 9B are flowcharts showing examples of the operation of the storage device.

Figure 8:
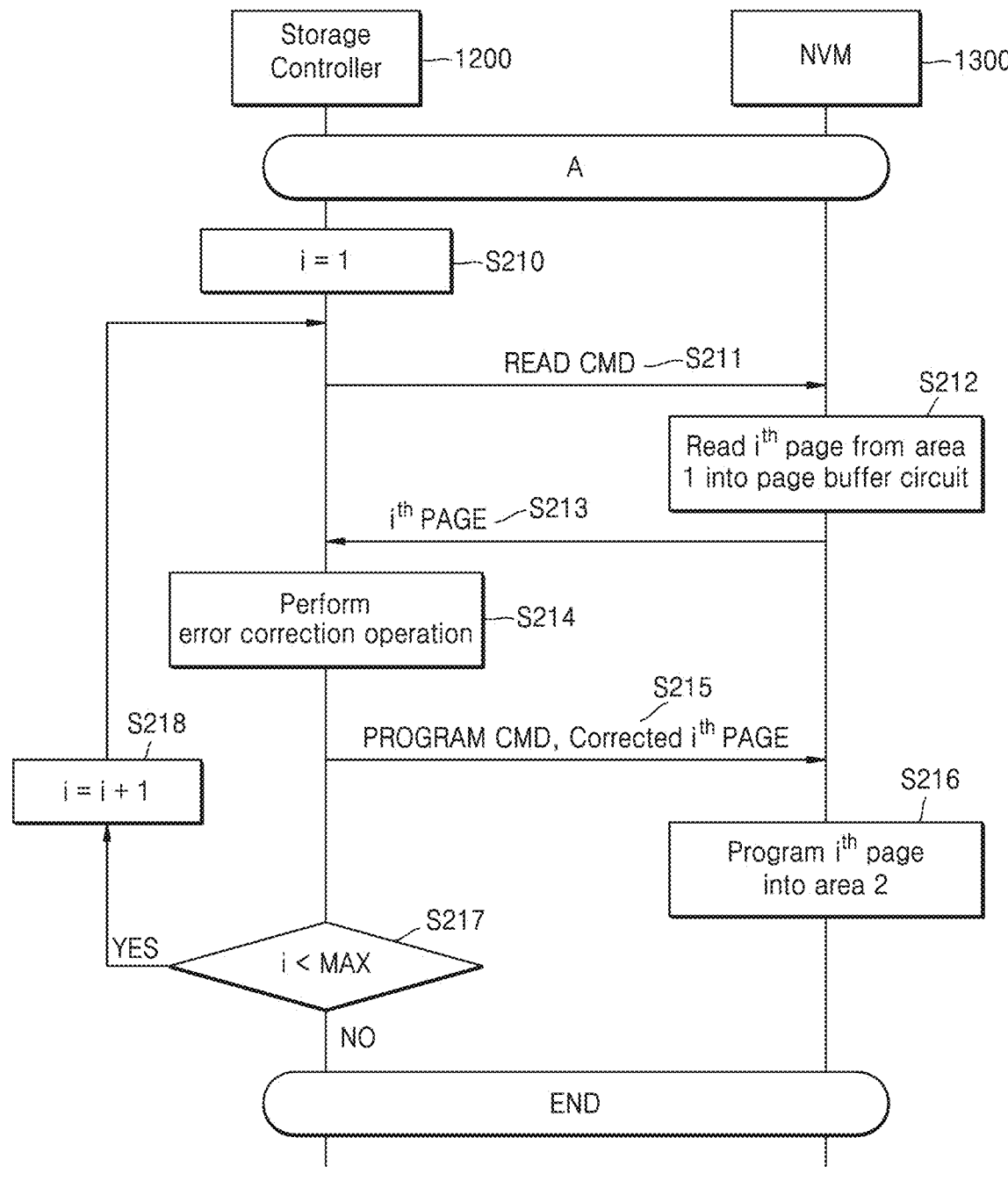
FIG. 8 is a flowchart of an example of an operation of a storage device according to one or more embodiments.
Figure 9A:
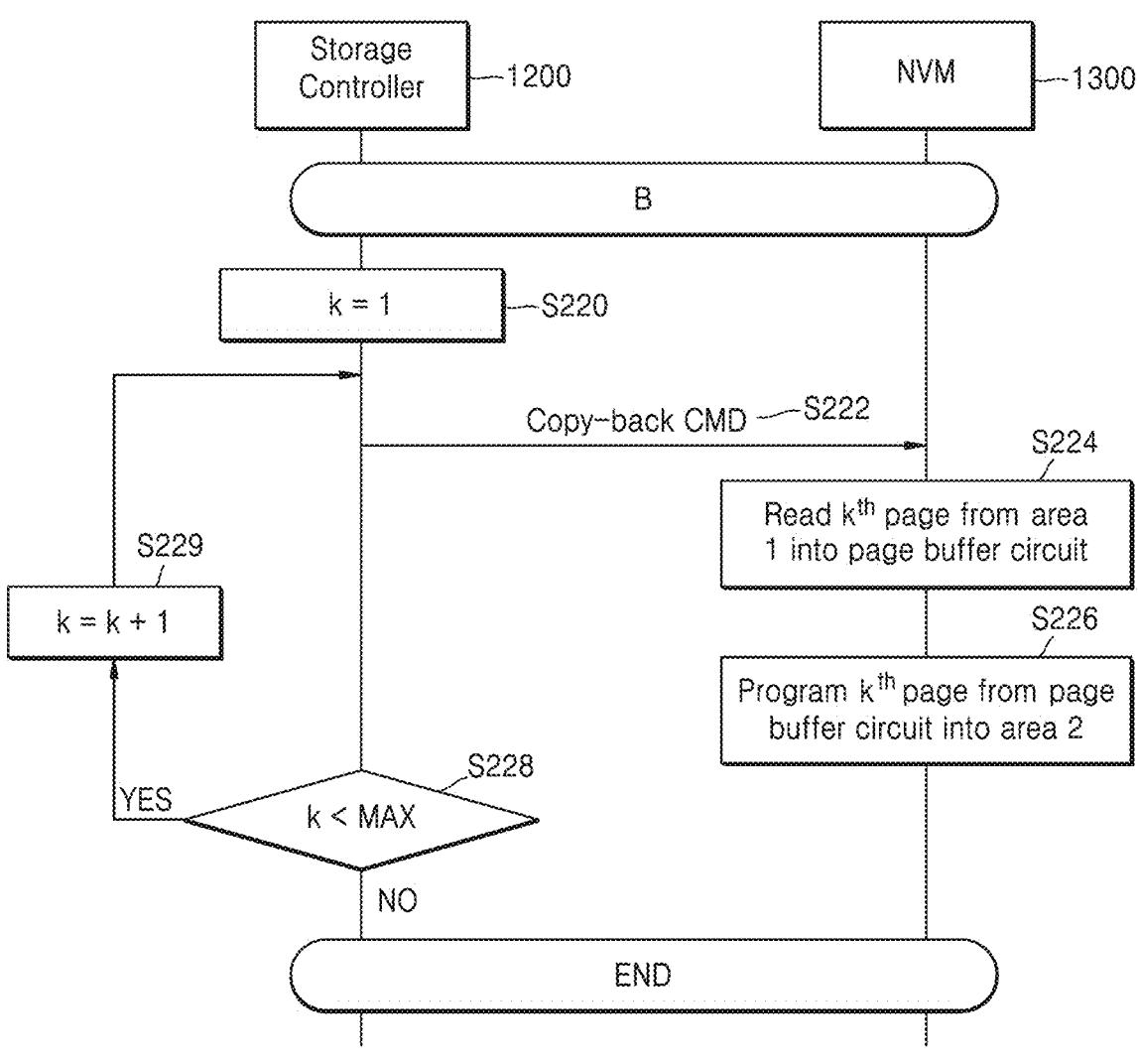
FIGS. 9A and 9B are flowcharts of examples of an operation of a storage device according to one or more embodiments.
Figure 9B:
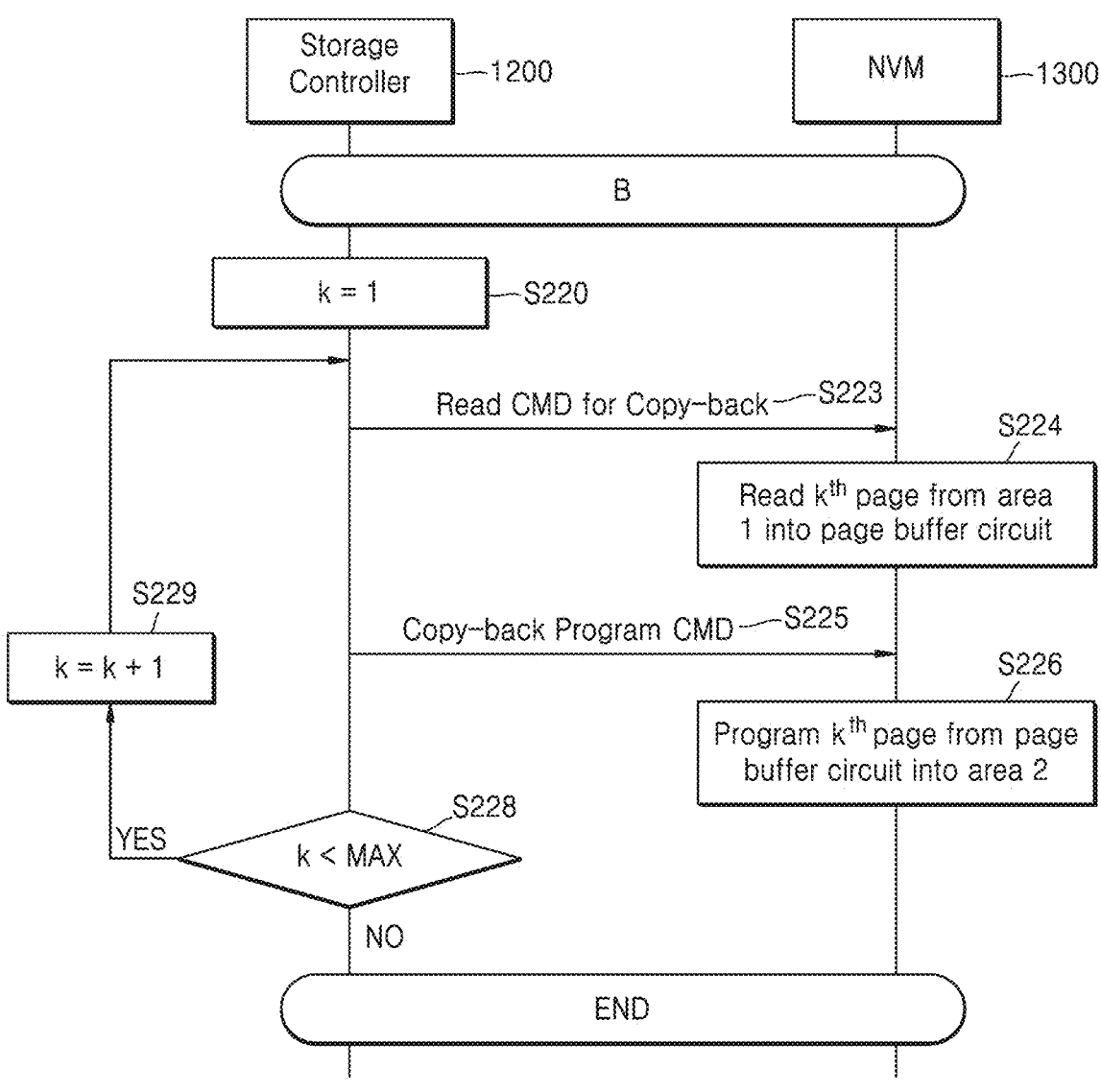

Referring to FIG. 8, the external copy-back operation for the plurality of pages of the group is described. Referring to FIG. 9A, a first example of an internal copy-back operation of the plurality of pages of the group is described. Referring to FIG. 9B, a second example of an internal copy-back operation of the plurality of pages of the group is described.

Referring to FIGS. 1, 7, 8, 9A, and 9B, the storage device 1100 may perform the copy-back operation in accordance with one or more embodiments. The storage device 1100 may move data stored in the first area A1 to the second area A2.

Figure 7:
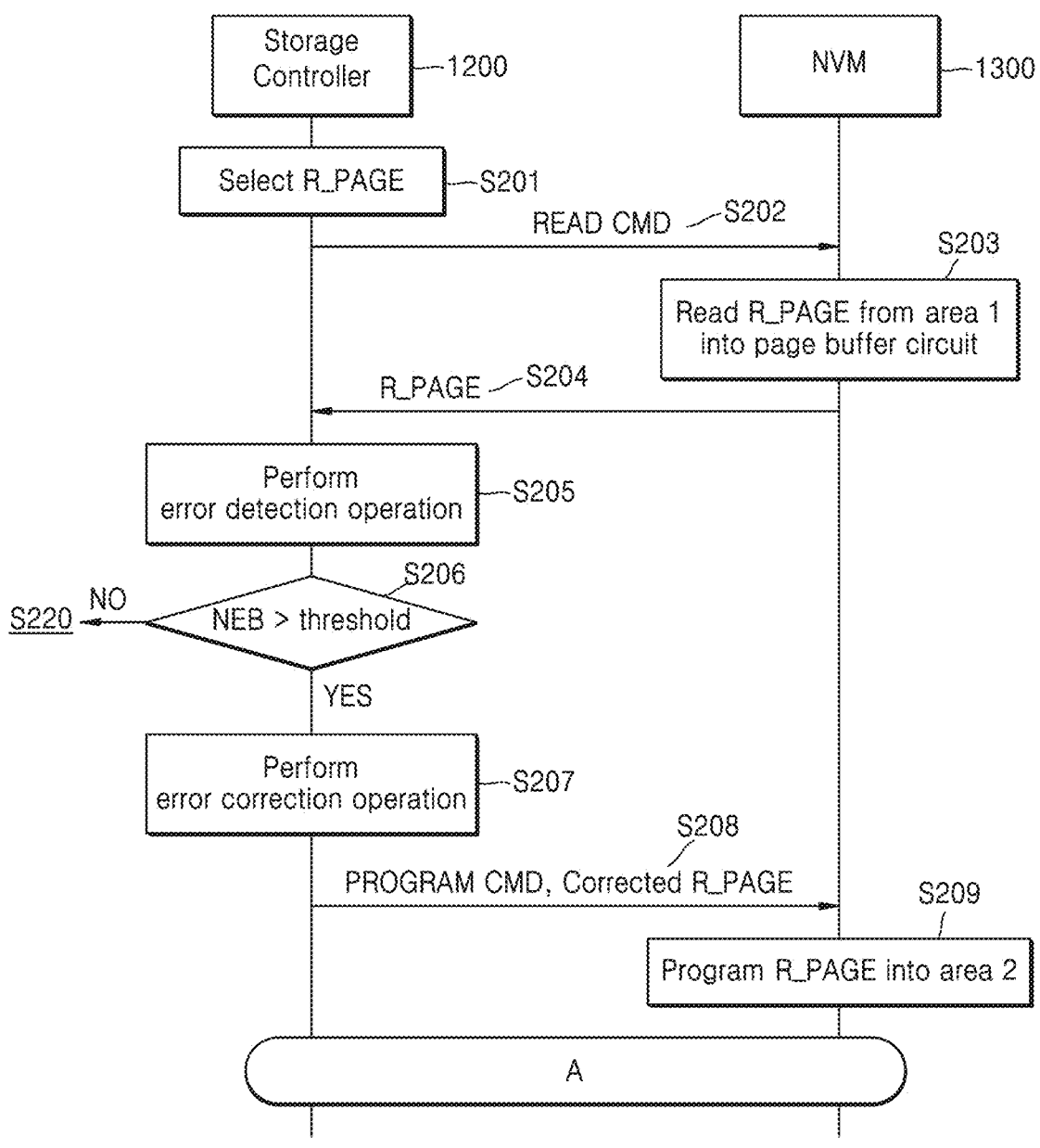
FIG. 7 is a flowchart of an example of an operation of a storage device according to one or more embodiments.

Referring to FIG. 7, in operation S201, the storage controller 1200 may select the representative page of the group. The storage controller 1200 may select a representative page R_PAGE of the group stored in the first area A1. The storage controller 1200 may select the firstly programmed page in the group as the representative page R_PAGE. The storage controller 1200 may perform the read operation to identify the NEB for the representative page R_PAGE.

In operation S202, the storage controller 1200 may transmit the read command for the representative page R_PAGE to the NVM 1300. The storage controller 1200 may transmit the read command including the address corresponding to the representative page R_PAGE to the NVM 1300. The address may refer to a portion of the first area A1.

In operation S203, the NVM 1300 may read the representative page R_PAGE into the page buffer circuit 1340 in the first area A1. In response to the read command, the NVM 1300 may store the representative page R_PAGE read by performing a sensing operation in the page buffer circuit 1340.

In operation S204, the NVM 1300 may transmit the representative page R_PAGE to the storage controller 1200. The NVM 1300 may transmit the representative page R_PAGE to the storage controller 1200 through the data signal DQx.

In operation S205, the storage controller 1200 may perform the error detection operation. The storage controller 1200 may determine the NEB of the representative page R_PAGE. In operation S206, the storage controller 1200 may compare the NEB with the threshold value. The storage controller 1200 may perform operation S207 (error correction operation) if the NEB of the representative page R_PAGE exceeds the threshold value and may perform operation S220 if the NEB of the representative page R_PAGE is equal to or less than the threshold value.

If the NEB of the representative page R_PAGE is less than the threshold, the error correction operation for the representative page R_PAGE may not be performed. The storage controller 1200 may program the representative page R_PAGE into the second area A2. In one or more examples, the storage controller 1200 may transmit a copy-back command (or a copy-back program command) for the representative page R_PAGE to the NVM 1300 to store the representative page R_PAGE in the second area A2. In response to the copy-back command (or the copy-back program command), the NVM 1300 may store the representative page R_PAGE stored in the page buffer circuit 1340 in the second area A2. Subsequently, the storage controller 1200 may repeat the internal copy-back operation for the remaining pages of the group. The storage controller 1200 may perform operations S220 to S229.

In operation S207, the storage controller 1200 may perform the error correction operation for the representative page R_PAGE. The storage controller 1200 may correct the representative page R_PAGE to generate a corrected representative page R_PAGE.

In operation S208, the storage controller 1200 may transmit the program command and the corrected representative page R_PAGE to the NVM 1300. The NVM 1300 may receive the program command and the corrected representative page R_PAGE through the data signal DQx.

In operation S209, the NVM 1300 may program the representative page R_PAGE into the second area A2. The NVM 1300 may store the corrected representative page R_PAGE in the second area A2. Subsequently, the storage device 1100 may perform operation S210.

If the NEB of the representative page R_PAGE is greater than the threshold value, the storage device 1100 may perform the external copy-back operation for the remaining pages of the group. The external copy-back operation may include operations S210 to S218 (FIG. 8). Referring to FIG. 8, in operation S210, the storage controller 1200 may set variable i to 1. For example, the variable i is used to describe the repeated performing of the external copy-back operation and does not limit the scope of the embodiments of the present disclosure.

The storage controller 1200 may perform the read operation for an ith page. In operation S211, the storage controller 1200 may transmit the read command to the NVM 1300. The storage controller 1200 may transmit the read command including the address corresponding to the ith page to the NVM 1300. The address may refer to a portion of the first area A1.

In operation S212, the NVM 1300 may read the ith page into the page buffer circuit 1340 in the first area A1. In response to the read command, the NVM 1300 may store the ith page read by performing the sensing operation in the page buffer circuit 1340.

In operation S213, the NVM 1300 may transmit the ith page to the storage controller 1200. The NVM 1300 may transmit the ith page to the storage controller 1200 through the data signal DQx.

In operation S214, the storage controller 1200 may perform the error correction operation for the ith page. The storage controller 1200 may correct the ith page to generate a corrected ith page.

In one or more embodiments, the storage controller 1200 may perform the error detection operation before performing the error correction operation. The storage controller 1200 may perform the error detection operation for the ith page. If an error for the ith page is detected, the storage controller 1200 may perform the error correction operation for the ith page. If the error for the ith page is not detected, the storage controller 1200 may not perform the error correction operation. If the error for the ith page is not detected, the storage controller 1200 may program the ith page into the second area A2. In one or more examples, the storage controller 1200 may transmit the copy-back command for the ith page to the NVM 1300 to store the ith page in the second area A2.

The storage controller 1200 may store the ith page in the second area A2. In operation S215, the storage controller 1200 may transmit the program command and the corrected ith page to the NVM 1300. The NVM 1300 may receive the program command and the corrected ith page. In operation S216, the NVM 1300 may program the ith page into the second area A2. The NVM 1300 may store the corrected ith page in the second area A2 in response to the program command.

In operation S217, the storage controller 1200 may determine whether the variable i is a maximum value. For example, the maximum value may refer to the number of pages of the group. If the variable i is a maximum value, since all pages of the group are moved from the first area A1 to the second area A2, the copy-back operation is completed. If the variable i is not maximum, the storage controller 1200 performs operation S218. In operation S218, the storage controller 1200 may increase the variable i by 1. Subsequently, the storage controller 1200 may perform operation S211. In one or more examples, the maximum value may be set to an integer corresponding to a number of pages in the group of page. In one or more examples, the maximum value may be set to an integer less than the number of pages in the group of pages.

As described above, the storage device 1100 may perform an external copy-back operation. The storage controller 1200 may transmit the read command for the page to the NVM 1300. The NVM 1300 may output the page to the storage controller. The storage controller 1200 may perform the error correction operation for the page. The storage controller 1200 may output the program command and the corrected ith page to the NVM 1300.

If the NEB of the representative page R_PAGE is equal to or less than the threshold value, the storage device 1100 may perform the internal copy-back operation for the remaining pages of the group. The internal copy-back operation may include operations S220 to S229 (FIG. 9A). Referring to FIG. 9A, in operation S220, the storage controller 1200 may set the variable k to 1. For example, the variable k is used to describe the repeated performing of the internal copy-back operation and does not limit the scope of the embodiments of the present disclosure.

The storage controller 1200 may perform the internal copy-back operation for the kth page. In operation S222, the storage controller 1200 may transmit the copy-back command to the NVM 1300. The NVM 1300 may receive the copy-back command. In operation S224, the NVM 1300 may read the kth page into the page buffer circuit 1340 in the first area A1. In response to the copy-back command, the NVM 1300 may store the kth page read by performing a sensing operation in the page buffer circuit 1340.

In operation S226, the NVM 1300 may program the kth page into the second area A2. The NVM 1300 may store the kth page stored in the page buffer circuit 1340 in the second area A2. In one or more examples, after the kth page is programmed into the second area A2, the kth page is deleted from the page buffer circuitry 1340.

In operation S228, the storage controller 1200 may determine whether the variable k is a maximum value. For example, the maximum value may refer to the number of pages of the group. If the variable k is the maximum value, since all pages of the group are moved from the first area A1 to the second area A2, the copy-back operation is completed. If the variable k is not the maximum value, the storage controller 1200 performs operation S229. In operation S229, the storage controller 1200 may increase the variable k by 1. Subsequently, the storage controller 1200 may perform operation S222. In one or more examples, after the kth page is programmed into the second area A2, the kth page is deleted from the page buffer circuitry 1340.

As described above, the storage device 1100 may perform the internal copy-back operation. The storage controller 1200 may transmit the copy-back command. In response to the copy-back command, the NVM 1300 may sense data stored in the first area A1 and store the sensed data in the page buffer circuit 1340. The NVM 1300 may store the page stored in the page buffer circuit 1340 in the second area A2.

Referring to FIG. 9B, since operations S220, S224, S226, S228, and S229 are the same or similar to operations S220, S224, S226, S228, and S229 of FIG. 9A, respectively, detailed descriptions thereof are omitted. In operation S220, the storage controller 1200 may set the variable k to 1. In operation S223, the storage controller 1200 may transmit the read command for the copy-back to the NVM 1300. In operation S224, the NVM 1300 may read the kth page in the first area A1, in response to the read command for the copy-back. The NVM 1300 may store the kth page in the page buffer circuit 1340.

In operation S225, the storage controller 1200 may transmit the copy-back program command to the NVM 1300. In operation S226, the NVM 1300 may program the kth page into the second area A2 in response to the copy-back program command. The NVM 1300 may store the kth page stored in the page buffer circuit 1340 in the second area A2. In operation S228, the storage controller 1200 may determine whether the variable k is a maximum value. If the variable k is not maximum, the storage controller 1200 performs operation S229. In operation S229, the storage controller 1200 may increase the variable k by 1. Subsequently, the storage controller 1200 may perform operation S223. The maximum value may be determined as described above.

As described above, when the error rate of the representative page R_PAGE is low, the storage controller 1200 may not perform the error detection operation for the remaining pages of the group and may not perform the error correction operation for the remaining pages of the group. In one or more embodiments, the NVM 1300 may not output the remaining pages of the group to the outside or may not receive data input from the outside. That is, the NVM 1300 may move the remaining pages of the group only to the inside. In one or more examples, when the error rate of the representative page R_PAGE is low, the maximum value discussed above may be set to a value that is less than the number of pages in the group.

Figure 10A:
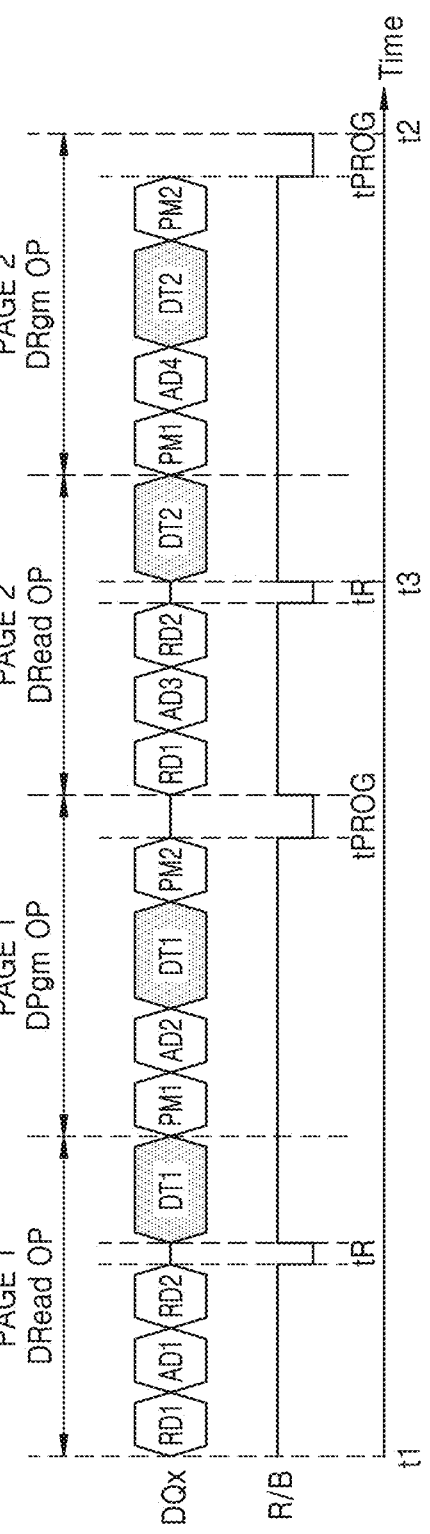
FIGS. 10A and 10B are timing diagrams of examples of an operation of a storage device according to one or more embodiments.
Figure 10B:
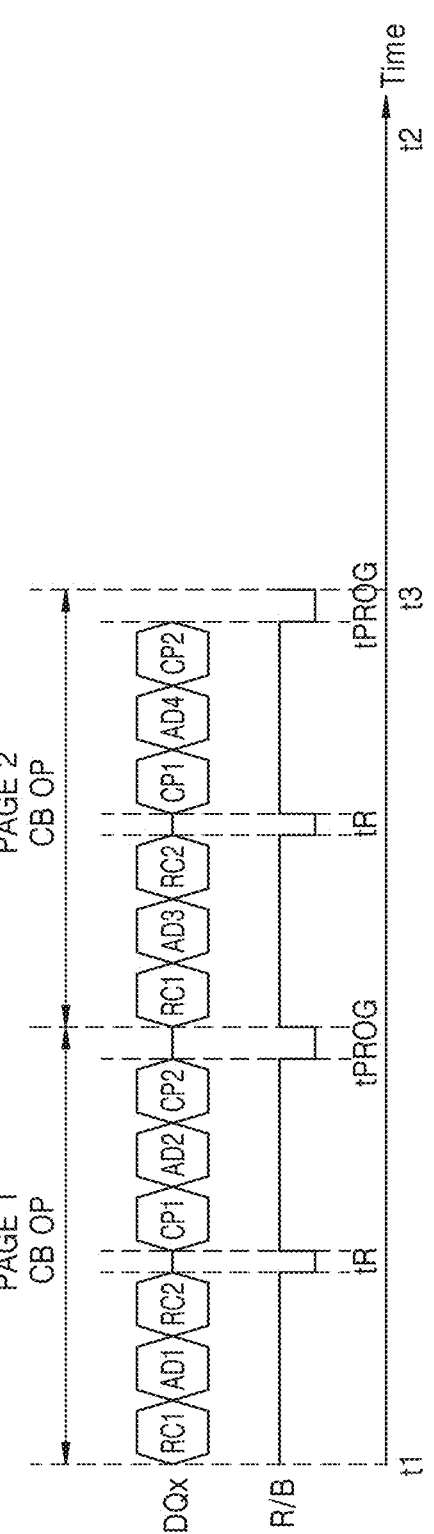

FIGS. 10A and 10B are timing diagrams showing examples of the operation of the storage device.

The external copy-back operation is described with reference to FIG. 10A and the internal copy-back operation is described with reference to FIG. 10B. FIGS. 10A and 10B are illustrated except for the input/output of the representative page R_PAGE.

Referring to FIGS. 1 and 10A, when the NEB of the representative page R_PAGE exceeds the threshold value, the storage controller 1200 may repeat the external copy-back operation for the remaining pages of the group. For example, the storage controller 1200 may perform a read operation for a first page PAGE1 DRead OP. The storage controller 1200 may perform a program operation for the first page PAGE1 DPgm OP. The storage controller 1200 may perform a read operation for a second page PAGE2 DRead OP. The storage controller 1200 may perform a program operation for the second page PAGE2 DPgm OP.

In particular, the storage controller 1200 may perform the read operation for the first page PAGE1 DRead OP. The storage controller 1200 may transmit a first read command RD1 during the command input mode (CMD Input). Subsequently, the storage controller 1200 may transmit a first address AD1 during the address input mode (ADDR Input). For example, the first address AD1 may be the address of the first area A1 for the first page.

Subsequently, in one or more examples, the storage controller 1200 may transmit a second read command RD2 during the command input mode (CMD Input) to the NVM 1300. The NVM 1300 may read the data of the first page corresponding to the first address AD1 as first data DT1 during a time tR, in response to the second read command RD2.

Subsequently, in one or more examples, the storage controller 1200 may perform the error detection operation and the error correction operation for the received first data DT1. The storage controller 1200 may generate corrected first data DT1. The storage controller 1200 may store the corrected first data DT1 in the second area A2.

Subsequently, in one or more examples, the storage controller 1200 may perform the program operation for the first page PAGE1 DPgm OP. The storage controller 1200 may transmit a first program command PM1 during the command input mode (CMD Input) to NVM 1300. Subsequently, in one or more examples, the storage controller 1200 may transmit the second address AD2 during the address input mode (ADDR Input) to NVM 1300. For example, the second address AD2 may be the address of the second area A2 for the first page.

Subsequently, in one or more examples, the storage controller 1200 may transmit the first data DT1 during the data input mode (Data Input) to NVM 1300 . . . . Subsequently, the storage controller 1200 may transmit a second program command PM2 during the command input mode (CMD Input) to NVM 1300. In response to the second program command PM2, the NVM 1300 may program the first data DT1 into the second address AD2 during a time tPROG. In one or more embodiments, after the time tPROG, the storage controller 1200 may transmit a state read command to the NVM 1300 and receive the state of the NVM 1300 from the NVM 1300.

The storage controller 1200 may perform the read operation for the second page PAGE2 DRead OP. The storage controller 1200 may transmit the first read command RD1 during the command input mode (CMD Input) to the NVM 1300. Subsequently, in one or more examples, the storage controller 1200 may transmit a third address AD3 during the address input mode (ADDR Input) to the NVM 1300. For example, the third address AD3 may be the address of the first area A1 for the second page.

Subsequently, in one or more examples, the storage controller 1200 may transmit the second read command RD2 during the command input mode (CMD Input) to NVM 1300. The NVM 1300 may read the data of the second page corresponding to the third address AD3 as second data DT2 during the time tR, in response to the second read command RD2.

Subsequently, in one or more examples, the storage controller 1200 may perform the error detection operation and the error correction operation for the received second data DT2. The storage controller 1200 may generate corrected second data DT2. The storage controller 1200 may store the corrected second data DT2 in the second area A2.

Subsequently, in one or more examples, the storage controller 1200 may perform the program operation for the second page PAGE2 DPgm OP. The storage controller 1200 may transmit the first program command PM1 during the command input mode (CMD Input). Subsequently, in one or more examples, the storage controller 1200 may transmit a fourth address AD4 during the address input mode (ADDR Input). For example, the fourth address AD4 may be the address of the second area A2 for the second page.

Subsequently, the storage controller 1200 may transmit the second data DT2 during the data input mode (Data Input). Subsequently, the storage controller 1200 may transmit the second program command PM2 during the command input mode (CMD Input). In response to the second program command PM2, the NVM 1300 may program the second data DT2 into the fourth address AD4 during a time tPROG.

Subsequently, in one or more examples, the storage controller 1200 may, similarly to the description above, perform the read operation and the program operation for the third to nth pages of the group. Detailed descriptions thereof are omitted. In this way, by performing the read operation and the program operation for the pages of the group, the storage controller 1200 may move the data stored in the first area A1 to the second area A2.

For example, the storage controller 1200 may start the read operation for the first page PAGE1 DRead OP in a first timepoint t1. The storage controller 1200 may finish the program operation for the second page PAGE2 DPgm OP in a second timepoint t2. For example, the storage controller 1200 may perform the external copy-back operation for the first page and the second page from the first timepoint t1 to the second timepoint t2.

Referring to FIGS. 1 and 10B, when the NEB of the representative page R_PAGE is equal to or lower than the threshold value, the storage controller 1200 may repeat the internal copy-back operation for the remaining pages of the group. For example, the storage controller 1200 may perform the copy-back operation for the first page PAGE1 CB OP. The storage controller 1200 may perform the copy-back operation for the second page PAGE2 CB OP.

Particularly, the storage controller 1200 may perform the copy-back operation for the first page PAGE1 CB OP. The storage controller 1200 may transmit a first read command for the copy-back RC1 during the command input mode (CMD Input). Subsequently, in one or more examples, the storage controller 1200 may transmit a first address AD1 during an address input mode (ADDR Input). For example, the first address AD1 may be the address of the first area A1 for the first page.

Subsequently, in one or more examples, the storage controller 1200 may transmit a second read command for the copy-back RC2 during the command input mode (CMD Input). The NVM 1300 may read the data of the first page corresponding to the first address AD1 into the page buffer circuit 1340 during a time tR, in response to the second read command for the copy-back RC2.

Subsequently, in one or more examples, the storage controller 1200 may transmit a first copy-back program command CP1 during the command input mode (CMD Input). Subsequently, the storage controller 1200 may transmit the second address AD2 during the address input mode (ADDR Input). For example, the second address AD2 may be the address of the second area A2 for the first page.

Subsequently, in one or more examples, the storage controller 1200 may transmit a second copy-back program command CP2 during the command input mode (CMD Input). In response to the second copy-back program command CP2, the NVM 1300 may program the data of the page buffer circuit 1340 into the second address AD2 during the time tPROG.

The storage controller 1200 may perform the copy-back operation for the second page PAGE2 CB OP. The storage controller 1200 may transmit the first read command for the copy-back RC1 during the command input mode (CMD Input). Subsequently, in one or more examples, the storage controller 1200 may transmit the third address AD3 during the address input mode (ADDR Input). For example, the third address AD3 may be the address of the first area A1 for the second page.

Subsequently, in one or more examples, the storage controller 1200 may transmit the second read command for the copy-back RC2 during the command input mode (CMD Input). The NVM 1300 may read the data of the second page corresponding to the third address AD3 into the page buffer circuit 1340 during a time tR, in response to the second read command for the copy-back RC2.

Subsequently, in one or more examples, the storage controller 1200 may transmit the first copy-back program command CP1 during the command input mode (CMD Input). Subsequently, the storage controller 1200 may transmit the fourth address AD4 during the address input mode (ADDR Input). For example, the fourth address AD4 may be the address of the second area A2 for the second page.

Subsequently, in one or more examples, the storage controller 1200 may transmit the second copy-back program command CP2 during the command input mode (CMD Input). In response to the second copy-back program command CP2, the NVM 1300 may program the data of the page buffer circuit 1340 into the fourth address AD4 during the time tPROG.

Subsequently, in one or more examples, the storage controller 1200 may, similarly to the description above, perform the copy-back operation for the third to nth pages of the group. Detailed descriptions thereof are omitted. In this way, by performing the internal copy-back operation for the pages of the group, the storage controller 1200 may move the data stored in the first area A1 to the second area A2.

For example, the storage controller 1200 may start the copy-back operation for the first page PAGE1 CB OP in a first timepoint t1. The storage controller 1200 may finish the copy-back operation for the second page PAGE2 CB OP in a third timepoint t3. For example, the storage controller 1200 may perform the internal copy-back operation for the first page and the second page from the first timepoint t1 to the third timepoint t3. The third timepoint t3 may be earlier than the second timepoint t2. The storage controller 1200 may perform the internal copy-back operation to decrease the time required for the copy-back operation. The internal copy-back operation may improve a write performance by not performing the data input/output operation through the data signal DQx.

Figure 11:
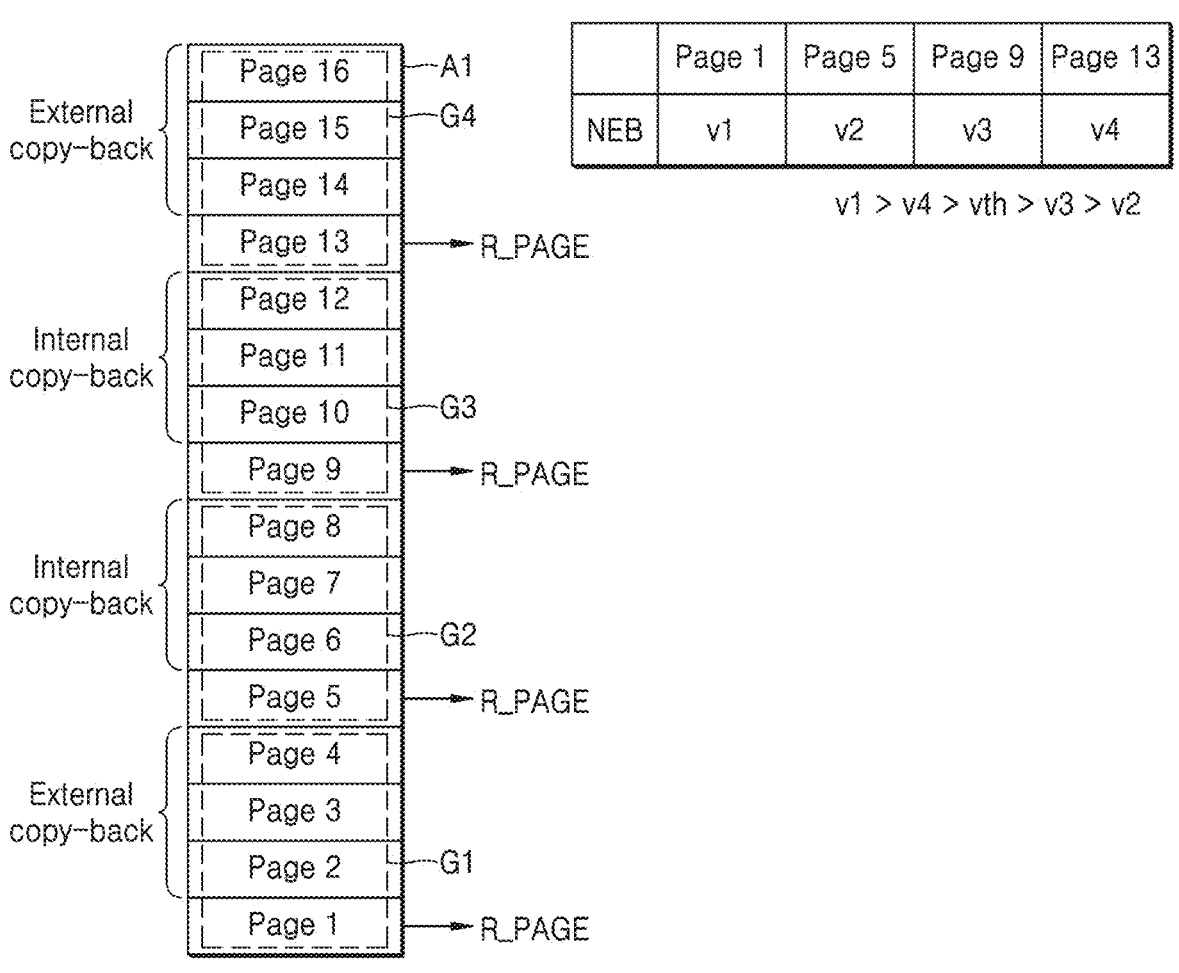
FIG. 11 is a diagram of an example of an operation of a storage device according to one or more embodiments.

FIG. 11 is a diagram of an example of the operation of the storage device in accordance with one or more embodiments.

Referring to FIGS. 1 and 11, the first area A1 may include first to sixteenth pages. For example, the storage controller 1200 may store the first to sixteenth page in the first area A1. The storage controller 1200 may classify the first to sixteenth pages into first to fourth groups G1 to G4. For example, the first group G1 may include the first to fourth pages, the second group G2 may include the fifth to eighth pages, the third group G3 may include the ninth to twelfth pages, and the fourth group G4 may include the thirteenth to 16th pages. Although each group includes an equal number of pages, the number of pages in each group may be varied that two groups contain a different number of pages.

The storage controller 1200 may select the representative page in the group. For example, the storage controller 1200 may select the first page as the representative page in the first group G1. The storage controller 1200 may select the fifth page as the representative page in the second group G2. The storage controller 1200 may select the ninth page as the representative page in the third group G3. The storage controller 1200 may select the thirteenth page as the representative page in the fourth group G4.

The NEB of the first page may be a first value v1, the NEB of the fifth page may be a second value v2, the NEB of the ninth page may be a third value v3, and the NEB of the thirteenth page may be a fourth value v4. The first value v1 may be greater than the fourth value v4, the fourth value v4 may be greater than the threshold value, the third value v3 may be less than the threshold value, and the second value v2 may be less than the third value v3.

The storage controller 1200 may determine the copy-back method of the group based on the NEB of the representative page. The storage controller 1200 may calculate the error rate of the first page in relation to the first group G1. The storage controller 1200 may read the first page from the NVM 1300 and perform the error detection operation for the first page. The storage controller 1200 may determine that the NEB of the first page is the first value v1. Since the threshold value is less than the first value v1, the storage controller 1200 may determine to perform the external copy-back operation for the first group G1. The storage controller 1200 may perform the external copy-back operation for the second to fourth pages and may store the second to fourth pages in the second area A2.

The storage controller 1200 may calculate the error rate of the fifth page in relation to the second group G2. The storage controller 1200 may read the fifth page, which is the representative page of the second group G2, from the NVM 1300 and perform the error detection operation for the fifth page. The storage controller 1200 may determine that the NEB of the fifth page is the second value v2. Since the second value v2 is less than the threshold value, the storage controller 1200 may determine to perform the internal copy-back operation for the second group G2. The storage controller 1200 may perform the internal copy-back operation for the sixth to eighth pages and may store the sixth to eighth pages in the second area A2.

The storage controller 1200 may calculate the error rate of the ninth page in relation to the third group G3. The storage controller 1200 may read the ninth page, which is the representative page of the third group G3, from the NVM 1300 and perform the error detection operation for the ninth page. The storage controller 1200 may determine that the NEB of the ninth page is the third value v3. Since the third value v3 is less than the threshold value, the storage controller 1200 may determine to perform the internal copy-back operation for the third group G3. The storage controller 1200 may perform the internal copy-back operation for the tenth to twelfth pages and may store the tenth to twelfth pages in the second area A2.

The storage controller 1200 may calculate the error rate of the thirteenth page in relation to the fourth group G4. The storage controller 1200 may read the thirteenth page from the NVM 1300 and perform the error detection operation for the thirteenth page. The storage controller 1200 may determine that the NEB of the thirteenth page is the fourth value v4. Since the fourth value v4 is greater than the threshold value, the storage controller 1200 may determine to perform the external copy-back operation for the fourth group G4. The storage controller 1200 may perform the external copy-back operation for the fourteenth to sixteenth pages and may store the fourteenth to sixteenth pages in the second area A2.

As described above, according to the error level of the representative page, the copy-back method of the remaining pages of the group may be determined during the copy-back operation. Instead of always performing the external copy-back operation, the external copy-back operation may be performed adaptively. The proportion of performing the external copy-back operation may be advantageously reduced. Accordingly, a storage device with improved performance may be provided.

Figure 12:
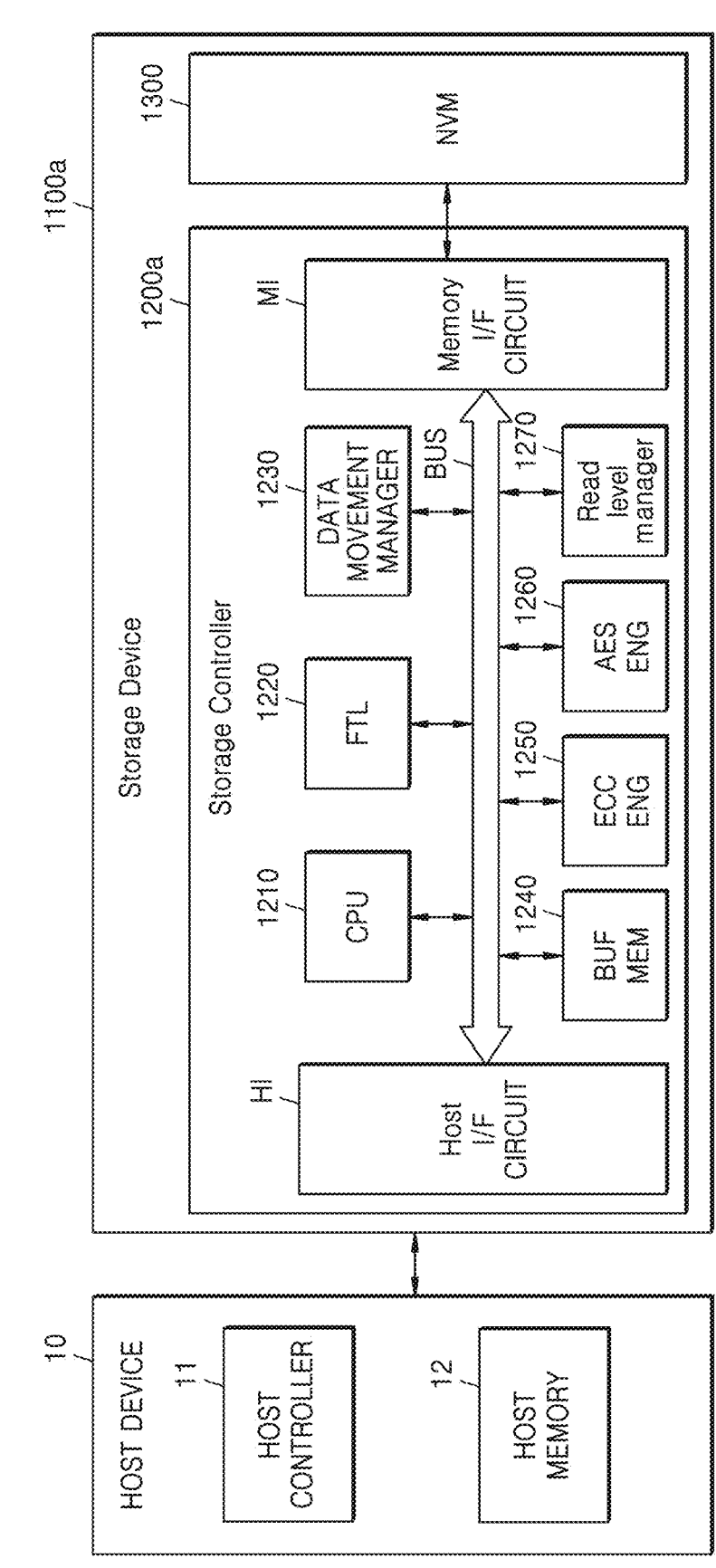
FIG. 12 is a block diagram of a storage system according to one or more embodiments.

FIG. 12 is a block diagram of a storage system 1000a according to one or more embodiments.

Referring to FIG. 12, the storage system 1000a may include the host device 10 and a storage device 1100a. In one or more embodiments, the storage device 1100a may include a storage controller 1200a and the NVM 1300. The host device 10 may include the host controller 11 and the host memory 12.

The storage controller 1200a may include the host interface circuit HI, the memory interface circuit MI, and the CPU 1210. In one or more embodiments, the storage controller 1200 may further include the FTL 1220, the data movement manager 1230, the buffer memory 1240, the ECC engine 1250, the AES engine 1260, and a read level manager 1270. For convenience of explanation, a detailed description of the components described above is omitted.

The read level manager 1270 may perform a read voltage search operation. The read voltage search operation may refer to an operation for determining an optimal read voltage level or a plurality of optimal read voltage levels. The read level manager 1270 may have a form of hardware, software, or a combination thereof, all configured to perform the read voltage search operation.

Due to various factors, the threshold voltage of the memory cells of the NVM 1300 may change. For example, a "retention deterioration" or "charge loss" may occur in memory cells. In one or more examples, "retention deterioration" or "charge loss" may refer to deterioration characteristics in which the threshold voltage of the memory cells is reduced. "Retention deterioration" or "charge loss" may occur over time from a time point when the memory cells are programmed.

A "read disturb" or "charge gain" may occur in the memory cells. In one or more examples, "read disturb" or "charge gain" may refer to deterioration characteristics in which the threshold voltage of the memory cells are increased. "Read disturb" or "charge gain" may be generated by repeated reading of the memory cells or surrounding memory cells.

In the programmed memory cells, an error may occur in the data read from the memory cells when the threshold voltage is increased or the threshold voltage is decreased. In the memory cells, when a retention deterioration or a read disturb occurs, an operation of controlling the read level or searching for the optimal read level may be performed.

The read level manager 1270 may be configured to manage the level of the read voltage used during the read operation in the NVM 1300. For example, the NVM 1300 may perform the read operation using a plurality of read voltages. In this case, errors of read data may occur due to various factors. In this case, by changing the levels of the plurality of read voltages, errors may be prevented. The read level manager 1270 may be configured to control the level of the plurality of read voltages, based on the deterioration information of the memory cells included in the NVM 1300. In one or more embodiments, the read level manager 1270 may control the plurality of read levels or search for the optimal read level through the read voltage search operation. In one or more examples, an optimal read level may be a read voltage that minimizes an error rate of pages stored in the NVM 1300.

For example, the read level manager 1270 may be configured to search for the optimal read voltage used in the NVM 1300. The read level manager 1270 may set operation parameters set based on the deterioration state of the memory cells and perform the read voltage search operation based on the set operation parameters.

The read level manager 1270 may perform the read voltage search operation for the representative page of the group and search the optimal read level. The read level manager 1270 may read the remaining pages of the group from the NVM 1300 by using the searched optimal read level. For example, the read level manager 1270 may apply the optimal read level of the representative page to other pages of the group. Accordingly, the storage device with improved reliability may be provided.

Figure 13:
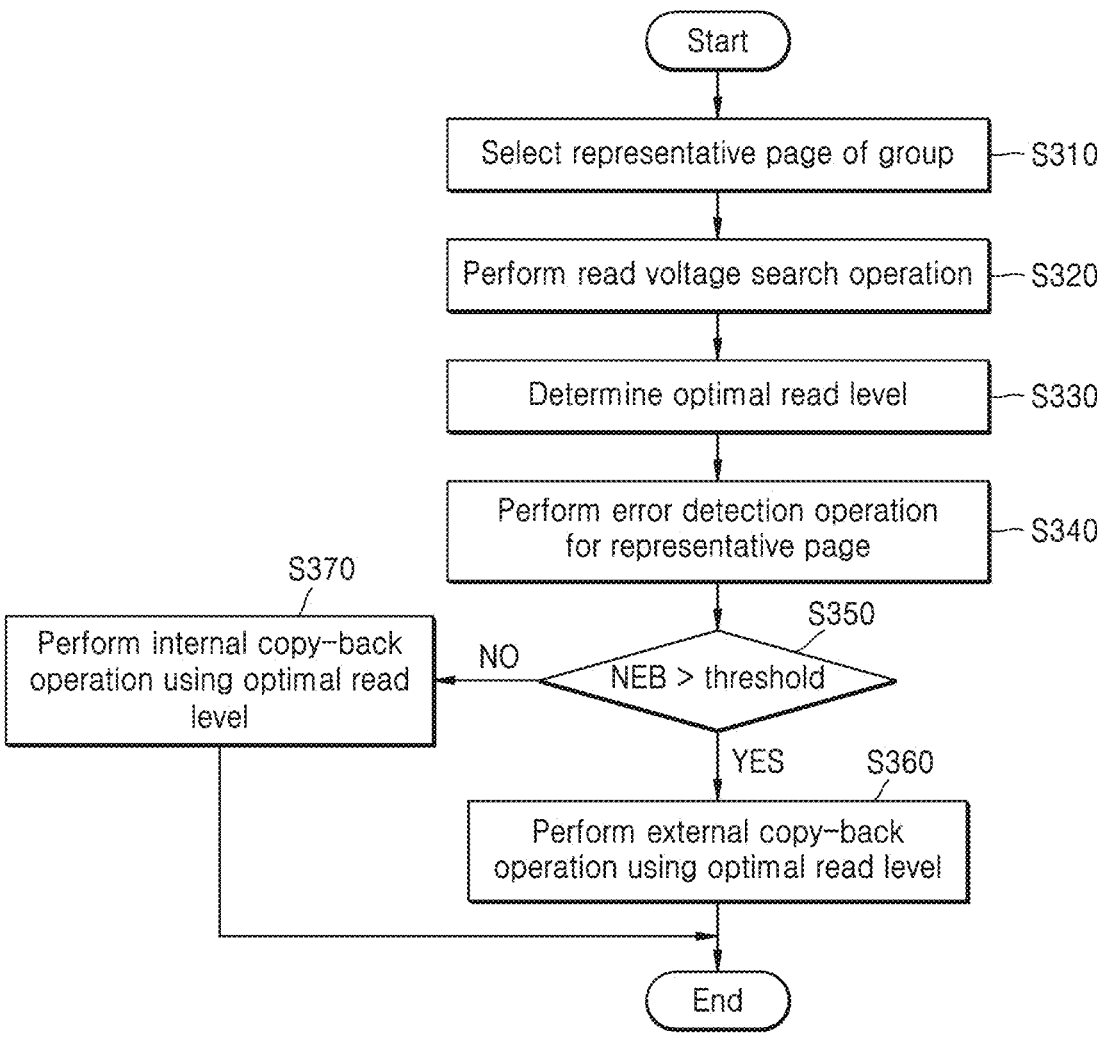
FIG. 13 is a flowchart of an example of an operation of a storage device of FIG. 12 according to one or more embodiments.

FIG. 13 is a flowchart of an example of the operation of the storage device of FIG. 12.

Referring to FIGS. 6, 12, and 13, since operations S310, S340, S350, S360, and S370 are similar to operations S110, S120, S130, S140, and S150 of FIG. 6, respectively, detailed descriptions thereof are omitted.

In operation S310, the storage controller 1200a may select the representative page of the group. For example, the storage controller 1200a may select the firstly programmed page in the group as the representative page. In operation S320, the storage device 1100a may perform the read voltage search operation. In one or more embodiments, the storage controller 1200a may search for the optimal read voltage for the representative page. The storage controller 1200a may perform read voltage search operation based on the deterioration state of the memory cells. The storage controller 1200a may search for the optimal read level through the read voltage search operation. In operation S330, the storage device 1100a may determine the optimal read level. The storage controller 1200a may determine the optimal read level of the representative page.

In operation S340, the storage device 1100a may perform the error detection operation for the representative page. The storage controller 1200a may determine the NEB of the representative page. In operation S350, the storage device 1100a may compare the NEB with the threshold value. The storage device 1100a may perform operation S360 when the NEB exceeds the threshold value, and may perform operation S370 when the NEB is equal to or less than the threshold value.

In operation S360, the storage device 1100a may perform the external copy-back operation for the pages of the group. The storage controller 1200a may perform the external copy-back operation by using the optimal read level of the representative page. The storage controller 1200a may perform the read operation for the remaining pages of the group. The storage controller 1200a may perform the error detection operation or the error correction operation for a page received from the NVM 1300. The storage controller 1200a may program the page into the second area A2.

In one or more embodiments, the storage controller 1200a may perform the read operation for the remaining pages of the group by using the optimal read level of the representative page. For example, the storage controller 1200a may transmit the read command including the optimal read level information to the NVM 1300. In one or more examples, the storage controller 1200a may set the optimal read level through a separate command (e.g., a set feature command). The NVM 1300 may read the pages of the first area A1 by using the optimal read levels of the representative page.

In operation S370, the storage device 1100a may perform the internal copy-back operation for the pages of the group. The storage controller 1200a may perform the internal copy-back operation by using the optimal read level of the representative page. The storage controller 1200a may transmit the copy-back command. In response to the copy-back command, the NVM 1300 may store the pages of the group stored in the first area A1 in the page buffer circuit 1340. The NVM 1300 may store the pages stored in the page buffer circuit 1340 in the second area A2.

In one or more embodiments, the storage controller 1200a may transmit the copy-back command (or the read command for the copy-back) including the optimal read level information to the NVM 1300. In one or more examples, the storage controller 1200a may set the optimal read level through a separate command (e.g., a set feature command). The NVM 1300 may read the pages of the first area A1 by using the optimal read levels of the representative page.

As described above, the storage device 1100a may perform the read voltage search operation for the representative page. The storage device 1100a may determine the optimal read level based on a result of the read voltage search operation. The storage device 1100a may repeat the external copy-back operation based on the optimal read level applied to the representative page. The storage device 1100a may repeat the internal copy-back operation based on the optimal read level applied to the representative page.

Figure 14:
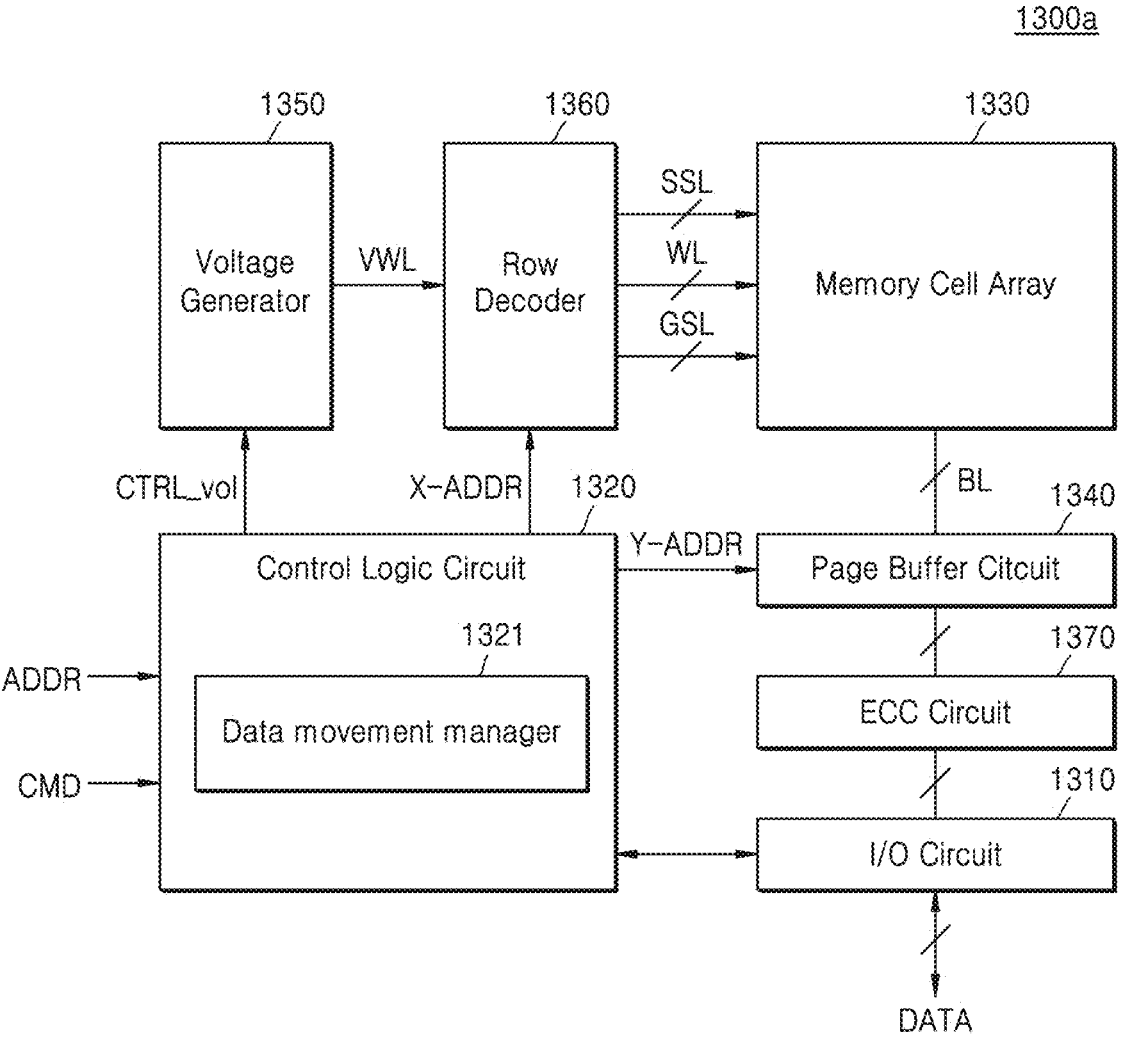
FIG. 14 is a block diagram of a non-volatile memory device according to one or more embodiments.

FIG. 14 is a block diagram of an NVM 1300a according to one or more embodiments.

Referring to FIGS. 2 and 14, the NVM 1300a may include the input/output circuit 1310, a control logic circuit 1320a, the memory cell array 1330, the page buffer circuit 1340, the voltage generator 1350, and the row decoder 1360. For convenience of explanation, a detailed description of the components described above is omitted.

In one or more embodiments, the NVM 1300a may include the ECC circuit 1370. The ECC circuit 1370 may perform the error detection and correction function for data sensed from the memory cell array 1330. The ECC circuit 1370 may perform the error detection operation and the error correction operation. The ECC circuit 1370 may perform the error detection operation to determine whether there is an error in the data. The ECC circuit 1370 may perform the error detection operation to determine the NEB of the data.

More particularly, the ECC circuit 1370 may generate parity bits for write data to be written to the memory cell array 1330, and the generated parity bits may be stored in the memory cell array 1330 together with the write data. When data is read from the memory cell array 1330, the ECC circuit 1370 may correct an error of the read data by using the parity bits read from the memory cell array 1330 together with the read data and may output read data of which the error is corrected.

In one or more embodiments, the ECC circuit 1370 may perform the error detection operation or the error correction operation by using one of CRC (e.g., CRC-16, CRC-32, CRC-64, CRC-128, CRC-256, etc.), Hamming code, LDPC, BCH code, RS code, Viterbi code, and Turbo code.

In one or more embodiments, since the NVM 1300a includes the ECC circuit 1370, the data may not be transmitted to the storage controller 1200a for the error detection operation and the error correction operation. The NVM 1300a may not output the data to the storage controller 1200a so as to move the data stored in the first area A1 to the second area A2.

In one or more embodiments, the NVM 1300a may sense data stored in the first area A1 and store the sensed data in the page buffer circuit 1340. The NVM 1300a may perform error detection operation and the error correction operation for data stored in the page buffer circuit 1340. The NVM 1300a may program the corrected data into the second area A2.

In one or more embodiments, the NVM 1300a may determine whether to perform the error detection operation and the error correction operation for the remaining pages of the group, based on the NEB of the representative page of the group. The NVM 1300 may select the representative page. The NVM 1300a may sense the representative page of the first area A1 and store the sensed representative page in the page buffer circuit 1340. The NVM 1300a may determine the NEB by performing the error detection operation for the representative page. The NVM 1300a may perform the error detection operation and the error correction operation for the remaining pages of the group when the NEB exceeds the threshold value. The NVM 1300a may not perform the error detection operation and the error correction operation for the remaining pages of the group when the NEB is less than or equal to the threshold value.

In one or more embodiments, the NVM 1300a may sense the remaining pages of the group in the first area A1 and store the remaining pages in the page buffer circuit 1340. The NVM 1300a may directly store the remaining pages of the group in the second area A2 without the error correction operation or the error detection operation.

The above descriptions are specific examples of implementing the embodiments of the present disclosure.

While the embodiments of the present disclosure have been particularly shown and described with reference to embodiments thereof, it will be understood that various changes in form and details may be made therein without departing from the spirit and scope of the following claims.

What is claimed is:

1. A method of operating a storage controller and a storage device comprising a non-volatile memory device, the method comprising:

selecting, by the storage controller, a representative page of a first group of pages stored in a first area included in the non-volatile memory device;

receiving, by the storage controller, the representative page from the non-volatile memory device;

performing, by the storage controller, an error detection operation of determining a number of error bits for the representative page;

based on determining that the number of error bits of the representative page exceeds a threshold value, performing an external copy-back operation, by the storage controller, for each of a plurality of pages of the first group of pages to a second area included in the non-volatile memory device, the second area located in a different portion of the non-volatile memory device than the first area; and based on determining that the number of error bits of the representative page is less than or equal to the threshold value, performing an internal copy-back operation, by the storage controller, for each of the plurality of pages of the first group of pages to the second area, wherein the selecting of the representative page of the first group of pages comprises selecting a page from the first group of pages that is programmed before the other pages in the first group of pages.

2. The method of claim 1, wherein the first area comprises a first set of memory cells configured to store n bits per cell, wherein the second area comprises a second set of memory cells configured to store m bits per cell, wherein n is a positive integer, and wherein m is a positive integer greater than n.

3. The method of claim 1, wherein the external copy-back operation comprises:

transmitting, by the storage controller, a read command for other pages in the first group of pages to the non-volatile memory device;

outputting, by the non-volatile memory device, the other pages to the storage controller;

performing, by the storage controller, an error correction operation on the other pages to generate a corrected page; and outputting, by the storage controller, a program command and the corrected page to the non-volatile memory device.

4. The method of claim 1, wherein the internal copy-back operation comprises transmitting a copy-back command by the storage controller to the non-volatile memory device.

5. The method of claim 4, wherein the internal copy-back operation further comprises:

in response to the copy-back command, (i) sensing, by the non-volatile memory device, a page stored in the first area, and (ii) storing, by the non-volatile memory device, the sensed page in a page buffer circuit, in response to the copy-back command; and programming, by the non-volatile memory device, the sensed page stored in the page buffer circuit into the second area.

6. The method of claim 1, further comprising comparing the number of error bits with the threshold value.

7. The method of claim 1, wherein determining a number of error bits for remaining pages of the first group, excluding the representative page, is skipped.

8. The method of claim 1, further comprising:

performing a read voltage search operation for the representative page; and determining one or more optimal read voltage levels based on a result of the read voltage search operation.

9. The method of claim 8, wherein the performing the external copy-back operation further comprises repeating the external copy-back operation based on the one or more optimal read voltage levels applied to the representative page, and the performing the internal copy-back operation comprises repeating the internal copy-back operation based on the one or more optimal read voltage levels applied to the representative page.

10. A storage device comprising:

a non-volatile memory device comprising a first area and a second area located in a different portion of the non-volatile memory device than the first area; and a storage controller configured to perform a migration operation in which pages of a first group of pages stored in the first area are moved to the second area, wherein the storage controller, to perform the migration operation, is configured to:

select a representative page of the first group of pages, perform an error detection operation that determines a number of error bits of the representative page of the first group of pages, based on a determination that the number of error bits of the representative page exceeds a threshold value, perform an external copy-back operation for each of a plurality of pages of the first group of pages to the second area, and based on a determination that the number of error bits of the representative page is less than or equal to the threshold value, perform an internal copy-back operation for each of the plurality of pages of the first group of pages, wherein the selection of the representative page comprises the storage controller configured to select a page from the first group of pages that is programmed before the other pages in the first group of pages.

11. The storage device of claim 10, wherein the external copy-back operation further comprises:

the storage controller configured to transmit a read command for other pages in the first group of pages to the non-volatile memory device, the non-volatile memory device configured to output the other pages to the storage controller, the storage controller configured to perform an error correction operation on the other pages to generate a corrected page, and the non-volatile memory device configured to receive a program command and the corrected page from the storage controller.

12. The storage device of claim 10, wherein the internal copy-back operation further comprises:

the storage controller configured to transmit a copy-back command to the non-volatile memory device, in response to the copy-back command, the non-volatile memory device configured to: (i) sense a page stored in the first area and (ii) store the sensed page in a page buffer circuit, and the non-volatile memory device configured to program the page stored in the page buffer circuit into the second area.

13. The storage device of claim 10, wherein determining a number of error bits for remaining pages of the first group, excluding the representative page, is skipped.

14. The storage device of claim 10, wherein the storage controller is configured to perform a read voltage search operation for the representative page and determine one or more optimal read voltage levels based on a result of the read voltage search operation.

15. The storage device of claim 14, wherein the storage controller is configured to repeat the internal copy-back operation and repeat the external copy-back operation based on the one or more optimal read voltage levels applied to the representative page.

16. A method of operating a storage controller configured to control a non-volatile memory device comprising a first area and a second area located in a different portion of the non-volatile memory device than the first area, the method comprising:

selecting a representative page of a first group of pages stored in the first area included in the non-volatile memory device;

receiving the representative page from the non-volatile memory device;

performing an error detection operation of determining a number of error bits for the representative page;

based on determining that the number of error bits of the representative page exceeds a threshold value, performing an external copy-back operation for each of a plurality of pages of the first group of pages to the second area included in the non-volatile memory device; and based on determining that the number of error bits of the representative page is less than or equal to the threshold value, performing an internal copy-back operation for each of the plurality of pages of the first group of pages, wherein the selecting of the representative page of the first group of pages comprises selecting a page from the first group of pages that is programmed before the other pages in the first group of pages.

17. The method of claim 16, wherein the external copy-back operation comprises:

transmitting a read command for other pages in the first group of pages to the non-volatile memory device;

receiving the other pages from the non-volatile memory device;

performing an error correction operation on the other pages to generate a corrected page; and outputting a program command and the corrected page to the non-volatile memory device.

18. The method of claim 16, wherein the internal copy-back operation comprises transmitting a copy-back command to the non-volatile memory device.

19. The method of claim 16, wherein determining a number of error bits for remaining pages of the first group, excluding the representative page, is skipped.

20. The method of claim 16, further comprising:

performing a read voltage search operation for the representative page; and determining one or more optimal read voltage levels based on a result of the read voltage search operation.

* * * * *